US011611365B2

(12) United States Patent
Kumar et al.

(10) Patent No.: US 11,611,365 B2
(45) Date of Patent: Mar. 21, 2023

(54) MILLIMETER WAVE EXPOSURE CONTROL DURING VOICE CALLS

(71) Applicant: QUALCOMM Incorporated, San Diego, CA (US)

(72) Inventors: Akash Kumar, Hyderabad (IN); Sumitkumar Shrikant Dubey, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/093,961

(22) Filed: Nov. 10, 2020

(65) Prior Publication Data

US 2022/0149880 A1 May 12, 2022

(51) Int. Cl.
  *H04B 1/3827* (2015.01)
  *H04B 7/06* (2006.01)

(52) U.S. Cl.
  CPC ......... *H04B 1/3838* (2013.01); *H04B 7/0626* (2013.01)

(58) Field of Classification Search
  CPC .............................. H04B 1/3838; H04B 7/0626
  See application file for complete search history.

(56) References Cited

U.S. PATENT DOCUMENTS

| | | | |
|---|---|---|---|
| 9,295,069 B2 | 3/2016 | Puranik et al. | |
| 10,587,299 B1* | 3/2020 | Sahoo | H04W 88/06 |
| 10,812,125 B1* | 10/2020 | Badic | H04B 7/0874 |
| 10,815,125 B2* | 10/2020 | Gopalan | C08F 8/00 |
| 2009/0295648 A1 | 12/2009 | Dorsey et al. | |
| 2013/0237272 A1 | 9/2013 | Prasad | |
| 2014/0080548 A1 | 3/2014 | Chen et al. | |
| 2016/0373175 A1* | 12/2016 | Harrison | H04B 7/0482 |
| 2019/0200365 A1 | 6/2019 | Sampath et al. | |
| 2020/0351771 A1* | 11/2020 | Geekie | H04W 76/15 |
| 2021/0297959 A1* | 9/2021 | Zhou | H04W 24/10 |

OTHER PUBLICATIONS

International Search Report and Written Opinion—PCT/US2021/054960—ISA/EPO—dated Feb. 11, 2022.

* cited by examiner

*Primary Examiner* — David B Lugo
(74) *Attorney, Agent, or Firm* — The Marbury Law Group/QUALCOMM Incorporated

(57) ABSTRACT

Aspects include systems, methods, devices, and non-transitory processor readable storage mediums for reducing excessive millimeter wave (mmW) radio frequency (RF) exposure to a user of a wireless device. Various aspects may enable an RF exposure condition for the wireless device to be detected while the wireless device is operating in a mmW mode during a voice. In some aspects, a mmW carrier quality report may be adjusted to deprioritize mmW in response to determining the RF exposure condition for the wireless device is occurring during the voice call.

40 Claims, 19 Drawing Sheets

MILLIMETER WAVE EXPOSURE CONTROL DURING VOICE CALLS

INTRODUCTION

The following relates generally to wireless communications, and more specifically to controlling millimeter wave (mmW) radio frequency (RF) exposure to a user of a wireless device during wireless communications.

Long Term Evolution (LTE), fifth generation (5G) new radio (NR), and other recently developed communication technologies allow wireless devices to communicate information at data rates (e.g., in terms of Gigabits per second, etc.) that are orders of magnitude greater than what was available just a few years ago. New technologies enabling increased data rates include the use of higher frequency bands, such as millimeter wave (mmW) frequency bands, and using beam forming antennas. There exists a need for further improvements in 5G NR technology. These improvements may also be applicable to other multi-access technologies and the telecommunication standards that employ these technologies.

SUMMARY

This summary is a simplified summation of one or more aspects presented to provide a basic understanding of such aspects. This summary is not an extensive overview of all aspects contemplated, is not intended to identify key or critical elements of all aspects, and is not meant to delineate the scope of any or all aspects. This summary's sole purpose is to present some aspects in a simplified form as a prelude to the more detailed description that is presented later.

A method for reducing excessive millimeter wave (mmW) radio frequency (RF) exposure to a user of a wireless device is described, the method may include determining an RF exposure condition for the wireless device is occurring while the wireless device is operating in a mmW mode during a voice call, and adjusting a mmW carrier quality report to deprioritize usage of mmW in response to determining that the RF exposure condition for the wireless device is occurring during the voice call.

An apparatus for wireless communication is described. The apparatus may include means for determining an RF exposure condition for a wireless device is occurring while the wireless device is operating in a mmW mode during a voice call, and means for adjusting a mmW carrier quality report to deprioritize usage of mmW in response to determining that the RF exposure condition for the wireless device is occurring during the voice call.

Another apparatus for wireless communication is described. The apparatus may include a memory and at least one processor coupled to the memory, the memory and the at least one processor configured to determine an RF exposure condition for a wireless device is occurring while the wireless device is operating in a mmW mode during a voice call, and adjust a mmW carrier quality report to deprioritize usage of mmW in response to determining that the RF exposure condition for the wireless device is occurring during the voice call.

A non-transitory processor readable storage medium having processor-executable instructions stored thereon configured to cause a processor of a wireless device to perform operations is described. The non-transitory processor readable storage medium may include stored processor-executable instructions configured to cause a processor of a wireless device to perform operations including determining an RF exposure condition for a wireless device is occurring while the wireless device is operating in a mmW mode during a voice call, and adjusting a mmW carrier quality report to deprioritize usage of mmW in response to determining that the RF exposure condition for the wireless device is occurring during the voice call.

Some examples of the method, apparatuses, and non-transitory processor readable storage medium described herein may include operations, features, means, or instructions for adjusting the mmW carrier quality report by setting a Channel Quality Indicator (CQI) for a mmW carrier to zero in a Channel State Information (CSI) report.

Some examples of the method, apparatuses, and non-transitory processor readable storage medium described herein may further include operations, features, means, or instructions for disabling mmW cell measurements and reporting in response to determining that the RF exposure condition for the wireless device is occurring during the voice call.

In some examples of the method, apparatuses, and non-transitory processor readable storage medium described herein, the RF exposure condition may be a head adjacent usage condition.

In some examples of the method, apparatuses, and non-transitory processor readable storage medium described herein, the RF exposure condition for the wireless device may include one or more loud speakers of the wireless device being turned off and all handsfree type connections being inactive during the voice call.

Some examples of the method, apparatuses, and non-transitory processor readable storage medium described herein may further include operations, features, means, or instructions for determining the RF exposure condition for the wireless device ended during the voice call, and adjusting a mmW carrier quality report to reprioritize usage of mmW in response to determining that the RF exposure condition for the wireless device ended during the voice call.

Some examples of the method, apparatuses, and non-transitory processor readable storage medium described herein may include operations, features, means, or instructions for adjusting the mmW carrier quality report to reprioritize usage of mmW by setting the CQI for the mmW carrier based on CQI measurements for the mmW carrier in a CSI report.

Some examples of the method, apparatuses, and non-transitory processor readable storage medium described herein may further include operations, features, means, or instructions for, prior to adjusting the mmW carrier quality report to deprioritize usage of mmW, determining an antenna array located away from a location of an ear speaker for the wireless device is available for mmW RF beaming in response to determining that the RF exposure condition for the wireless device is occurring during the voice call, in response to determining that the antenna array located away from the location of the ear speaker for the wireless device is available for mmW RF beaming, preventing all antenna arrays other than the antenna array located away from the location of the ear speaker for the wireless device from emitting mmW beams, and preventing the antenna array located away from the location of the ear speaker for the wireless device from emitting mmW beams having a beam width narrower than a threshold, and adjusting a mmW carrier quality report to deprioritize usage of mmW in response to determining that the antenna array located away from the location of the ear speaker for the wireless device is not available for mmW RF beaming.

Some examples of the method, apparatuses, and non-transitory processor readable storage medium described herein may include operations, features, means, or instructions for preventing the antenna array located away from the location of the ear speaker for the wireless device from emitting mmW beams having a beam width narrower than a threshold by modifying a codebook of the wireless device.

In some examples of the method, apparatuses, and non-transitory processor readable storage medium described herein, modifying the codebook of the wireless device may include removing L2 and narrower beams from the codebook.

Some examples of the method, apparatuses, and non-transitory processor readable storage medium described herein may include operations, features, means, or instructions for preventing all antenna arrays other than the antenna array located away from the location of the ear speaker for the wireless device from emitting mmW beams by modifying a codebook of the wireless device to remove beams from the codebook using all antenna arrays other than the antenna array located away from the location of the ear speaker for the wireless device.

Some examples of the method, apparatuses, and non-transitory processor readable storage medium described herein may further include operations, features, means, or instructions for, prior to adjusting the mmW carrier quality report to deprioritize usage of mmW, determining a first beam in use for mmW RF beaming is radiating in a direction associated with the user's head in response to determining that the RF exposure condition for the wireless device is occurring during the voice call, determining an antenna array located away from a location of an ear speaker for the wireless device is available for mmW RF beaming in response to determining that the first beam in use for mmW RF beaming is radiating in the direction associated with the user's head, determining a second beam for mmW RF beaming emitted by the antenna array located away from the location of the ear speaker for the wireless device is a suitable substitute for the first beam in response to determining that the antenna array located away from the location of the ear speaker for the wireless device is available for mmW RF beaming, wherein the second beam for mmW RF beaming emitted by the antenna array located away from the location of the ear speaker for the wireless device is emitted in a direction different from the first beam, and switching to the second beam for mmW RF beaming emitted by the antenna array located away from the location of the ear speaker for the wireless device for mmW operations in response to determining that the second beam for mmW RF beaming emitted by the antenna array located away from the location of the ear speaker for the wireless device is a suitable substituted for the first beam.

Some examples of the method, apparatuses, and non-transitory processor readable storage medium described herein may further include operations, features, means, or instructions for, adjusting a mmW carrier quality report to deprioritize usage of mmW in response to determining that the first beam in use for mmW RF beaming is not radiating in the direction associated with the user's head, that the antenna array located away from the location of the ear speaker for the wireless device is not available for mmW RF beaming, or the second beam for mmW RF beaming emitted by the antenna array located away from the location of the ear speaker for the wireless device is not a suitable substituted for the first beam.

Some examples of the method, apparatuses, and non-transitory processor readable storage medium described herein may further include operations, features, means, or instructions for, prior to adjusting the mmW carrier quality report to deprioritize usage of mmW, outputting an indication to the user to initiate a mmW reprioritization action in response to determining that the RF exposure condition for the wireless device is occurring during the voice call, determining the mmW reprioritization action occurs within a time threshold after outputting the indication to the user to initiate the mmW reprioritization action, and adjusting a mmW carrier quality report to deprioritize usage of mmW in response to determining that a mmW prioritization action does not occur within the time threshold.

In some examples of the method, apparatuses, and non-transitory processor readable storage medium described herein, the mmW reprioritization action may include turning on a loud speaker of the wireless device or activating a handsfree type connection.

Some examples of the method, apparatuses, and non-transitory processor readable storage medium described herein may further include operations, features, means, or instructions for determining a user indication of accepting mmW de-prioritization is received in response to outputting the indication to the user to initiate the mmW prioritization action, and adjusting a mmW carrier quality report to deprioritize usage of mmW in response to determining that the user indication of accepting mmW de-prioritization is received.

BRIEF DESCRIPTION OF THE DRAWINGS

The accompanying drawings, which are incorporated herein and constitute part of this specification, illustrate exemplary aspects of the claims, and together with the general description given above and the detailed description given below, serve to explain the features of the claims.

DETAILED DESCRIPTION

Figure 1:
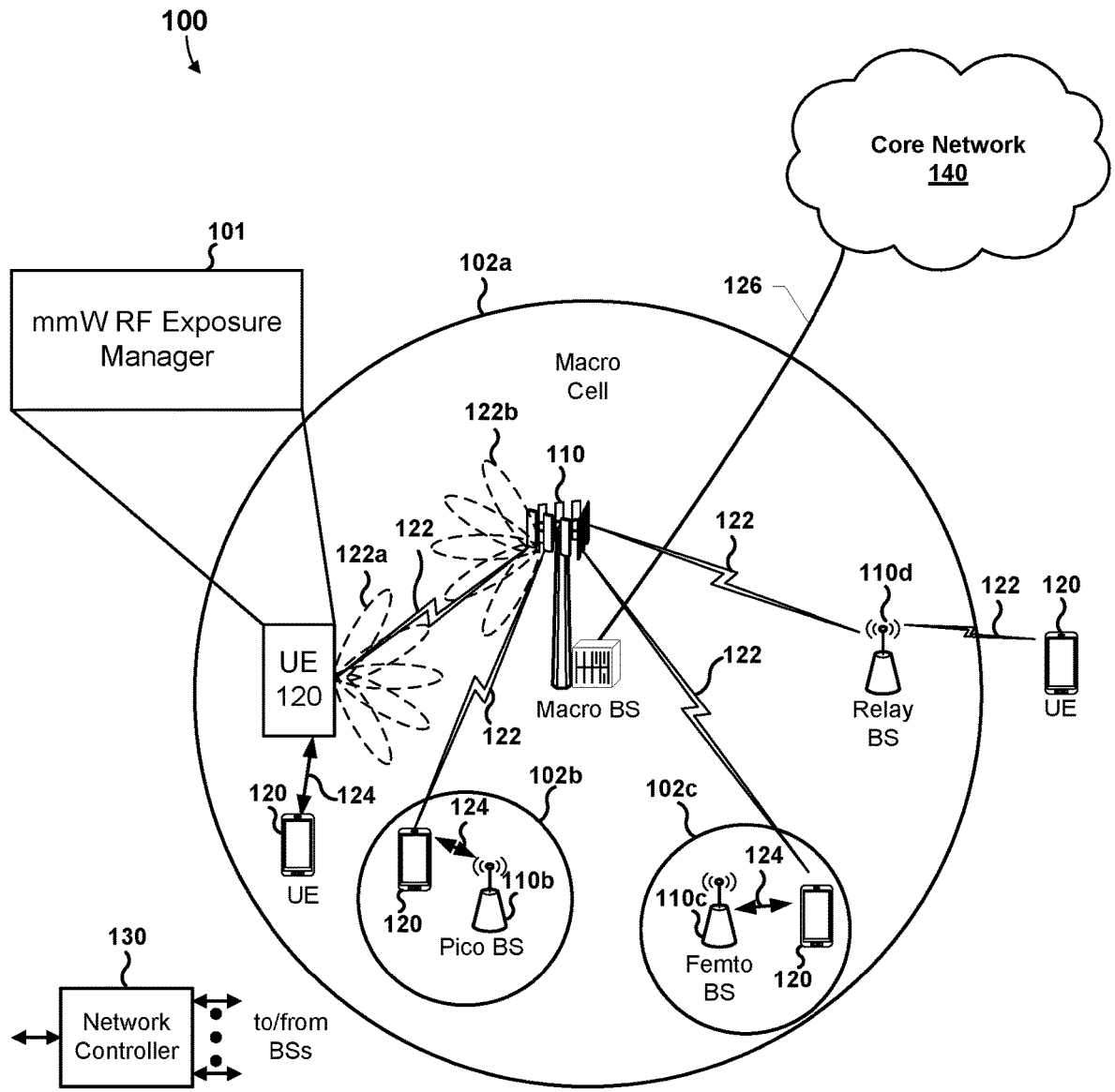
FIG. 1 is a system block diagram illustrating an example communication system in accordance with various aspects of the present disclosure.

Fifth generation (5G) new radio (NR) deployments are enabling various millimeter wave (mmW) modes of operation for wireless devices, such as Long Term Evolution (LTE) and mmW Evolved Universal Terrestrial Radio Access (E-UTRAN) NR—dual connectivity (ENDC) mode, Sub-6 gigahertz (GHz)(Sub-6 GHz) and mmW NR dual connectivity (NRDC) mode, etc. As mmW modes of operation for wireless devices become more prevalent, exposure to mmW radio frequency (RF) transmissions may become more likely. As one example, the potential of exposure of a user's head to mmW RF transmissions resulting in a power density of above 1 milliwatt (mW) per square centimeter ($cm^2$) ($mW/cm^2$) during voice calls in a mmW band is an area of growing concern to wireless device users in the United States. This is because the U.S. Federal Communications Commission (FCC) has set a limit on the skin surface power density to which users of wireless devices can be exposed of 1 $mW/cm^2$ or less regardless of the operating frequency. However, operating a wireless device in a mmW mode (e.g., ENDC, NRDC, etc.) during a voice call (e.g., a Voice over LTE (VoLTE) call, a Voice over NR (VoNR) call, etc.) when the user holds the device to an ear may expose the head of the user to an undesirable volumetric exposure of mmW radiation due to the fact that mmW radiation penetrates deeper than is the case for RF radiation in the frequency bands of LTE and similar technologies that have been addressed in government imposed power density limits. Reducing mmW RF exposure to a user of a wireless device may improve wireless device safety. Further, if a government entity establishes limits on mmW RF exposure to users of wireless devices, various embodiments provide methods and devices that can comply with such limits.

Various aspects include systems, methods, devices, and non-transitory processor readable storage mediums for reducing (or avoiding) excessive mmW RF exposure to a user of a wireless device. Ensuring mmW RF exposure to a user of a wireless device is within FCC acceptable power density levels may improve wireless device safety and/or may ensure wireless devices meet government requirements.

Various aspects may enable an RF exposure condition for the wireless device to be detected while the wireless device is operating in a mmW mode (e.g., ENDC, NRDC, etc.) during a voice call (e.g., a VoLTE call, a VoNR call, etc., whether the voice call is MO or MT). In some aspects, a mmW carrier quality report may be adjusted to deprioritize mmW in response to determining the RF exposure condition for the wireless device is occurring during the voice call. As an example, a Channel Quality Indicator (CQI) for a mmW carrier may be set to zero in a Channel State Information (CSI) report to thereby adjust a mmW carrier quality report to deprioritize mmW. In this manner, regardless of the actual CQI determined for the mmW carrier, the CSI report may be adjusted to indicate the mmW carrier has a worst possible quality of zero. As another example, a mmW carrier quality report may be adjusted to include an indication that mmW cells are unreachable to thereby adjust a mmW carrier quality report to deprioritize mmW.

In one or more examples, adjusting a mmW carrier quality report to deprioritize mmW may cause a network device, such as a base station, receiving the mmW carrier report to drop mmW cells and add non-mmW cells (e.g., LTE cells, Sub-6 GHz cells, etc.) configured for use by the wireless device. The network device, such as a base station, may send a new configuration message (e.g., a radio resource control (RRC) message, a Medium Access Control (MAC)—Configuration Element (CE)(MAC-CE) message, etc.) with only non-mmW cells (e.g., LTE cells, Sub-6 GHz cells, etc.) configured and the wireless device may stop mmW RF transmissions in response to the new configuration message as no mmW cells may be configured to support the voice call. In this manner, excessive mmW RF exposure may be reduced or avoided as mmW RF transmission may cease. The addition of non-mmW cells (e.g., LTE cells, Sub-6 GHz cells, etc.) by the network device, such as a base station, may compensate for any potential loss of throughput that could be experienced by stopping mmW RF transmission.

By proactively deprioritizing usage of mmW and causing a network device, such as a base station, to drop mmW cells in response to detecting an RF exposure condition while the wireless device is operating in a mmW mode (e.g., ENDC, NRDC, etc.) during a voice call (e.g., a VoLTE call, a VoNR call, etc., whether the voice call is MO or MT), various aspects may enable a wireless device to stay in a mmW mode (e.g., ENDC, NRDC, etc.) of operation while ceasing mmW RF transmissions. In this manner, mmW RF transmissions may be stopped without requiring time to be spent in negotiating a new operating mode between the network device, such as a base station, and the wireless device. Additionally, staying in a mmW mode (e.g., ENDC, NRDC, etc.) of operation may enable mmW RF transmissions to be resumed in response to the voice call ending or the RF exposure condition for the wireless device ending during the voice call without requiring a change in mode of operation by the wireless device. Rather, a mmW carrier quality report may be adjusted to reprioritize usage of mmW in response to determining that the RF exposure condition for the wireless device ended during the voice call or the voice call ended. As examples, the CQI for the mmW carrier may be set based on actual CQI measurements for the mmW carrier in a CSI report, a mmW carrier quality report may be adjusted to include an indication that mmW cells are reachable, etc., to reprioritize usage of mmW. Adjusting a mmW carrier quality report to reprioritize mmW may cause a network device, such as a base station, receiving the mmW carrier report to add back mmW cells configured for use by the wireless device. The network device, such as a base station, may send a new configuration message (e.g., RRC message, a MAC-CE message, etc.) including mmW cells configured and the wireless device may resume mmW RF transmissions.

In various aspects, mmW cell measurements and reporting may be disabled in response to determining the RF exposure condition for the wireless device is occurring during the voice call. Muting (e.g., disabling, ceasing, etc.) mmW measurement and reporting (e.g., all mmW measurement and reporting or few than all mmW measurement and reporting) may reduce the mmW RF transmissions made by the wireless device. In various aspects, while mmW cell measurements and reporting may be disabled, non-mmW cell (e.g., LTE cell, Sub-6 GHz cell, etc.) measurements and reporting may continue. In this manner, while mmW RF measurements and reporting may be muted (e.g., disabled, ceased), non-mmW cell (e.g., LTE cell, Sub-6 GHz cell, etc.) measurements and reporting may be reported in a usual manner based on cell measurements of non-mmW cells (e.g., LTE cells, Sub-6 GHz cells, etc.).

In various aspects, an antenna array located away from a location of an ear speaker for a wireless device may be used for emitting mmW beams in response to determining an RF exposure condition for the wireless device is occurring during a voice call (e.g., a VoLTE call, a VoNR call, etc., whether the voice call is MO or MT) while the wireless device is operating in a mmW mode (e.g., ENDC, NRDC, etc.). As used herein the term "away" means a spatial separation or distance from a particular thing, such as the head of a user. As such, an antenna array located away from a location of an ear speaker for a wireless device refers to an antenna array located on the wireless device a distance from a speaker of a wireless device because users typically hold a wireless device so that the speaker is close to the user's ear. A wireless device may have multiple antenna arrays physically located at different points of the wireless device. For example, in a wireless device configuration, one antenna array may be located at a generally top portion of the wireless device near where an ear speaker is often located and another antenna array may be located at a generally bottom portion of the wireless device away from the location of the ear speaker (e.g., at a bottom portion near a microphone or at a distal end opposite the antenna array located near the ear speaker to provide antenna array separation).

Antenna arrays relatively closer to an ear speaker than other antenna arrays are more likely to contribute to exposure of a user's head to mmW RF transmissions as compared to the other antenna arrays as the user may hold the wireless device's ear speaker to their ear during a voice call thereby positioning the antenna arrays relatively closer to the ear speaker closer to the user's head than the other antenna arrays. As distance between the antenna array and the user's head impacts the power density experienced at the user's head, mmW beams from the antenna arrays relatively closer to the ear speaker are likely to cause the user's head to experience higher power densities as compared to mmW beams from the other antenna arrays.

Various aspects may include determining whether an antenna array located away from a location of an ear speaker for the wireless device is available for mmW RF beaming in response to determining that an RF exposure condition for the wireless device is occurring during a voice call (e.g., a VoLTE call, a VoNR call, etc., whether the voice call is MO or MT) while the wireless device is operating in a mmW mode (e.g., ENDC, NRDC, etc.). As an example, the availability of an antenna array located away from a location of an ear speaker for the wireless device is available for mmW RF beaming may be based on configuration settings of the wireless device, status checks of antennas of the wireless device, user settings, operating modes of the wireless device, and/or any other criteria that may indicate whether or not an antenna array is available for mmW RF beaming.

Various aspects may include preventing all antenna arrays other than an antenna array located away from the location of the ear speaker for the wireless device from emitting mmW beams. The prevention of antenna arrays other than an antenna array located away from the location of the ear speaker for the wireless device from emitting mmW beams may prevent mmW RF beaming from those antennas most likely to cause excessive mmW RF transmission exposure to a user of a wireless device. As an example, preventing all antenna arrays other than the antenna array located away from the location of the ear speaker for the wireless device from emitting mmW beams may include modifying a codebook of the wireless device to remove beams (e.g., all beams or fewer than all beams) from the codebook using all antenna arrays other than the antenna array located away from the location of the ear speaker for the wireless device. As a specific example, all mmW beams using antenna arrays other than the antenna array located away from the location of the ear speaker may be excluded from, or disabled in, the codebook of the wireless device. As another example, preventing all antenna arrays other than the antenna array located away from the location of the ear speaker for the wireless device from emitting mmW beams may include disabling all antenna arrays other than the antenna array located away from the location of the ear speaker for the wireless device.

In various aspects, preventing all antenna arrays other than the antenna array located away from the location of the ear speaker for the wireless device from emitting mmW beams may be performed in response to determining that the antenna array located away from the location of the ear speaker for the wireless device is available for mmW RF beaming. In various aspects, preventing all antenna arrays other than the antenna array located away from the location of the ear speaker for the wireless device from emitting mmW beams may be performed prior to adjusting a mmW carrier report to deprioritize usage of mmW.

Various aspects may include preventing the antenna array located away from the location of an ear speaker for the wireless device from emitting mmW beams having a beam width narrower than a threshold. As the width of a beam may impact the power density experienced at the user's head, mmW beams having a relatively wider beam width may cause a user's head to experience relatively less power density than mmW beams having a relatively narrower beam width. For example, pencil beams may result in higher power densities than wide beams. Additionally, even when power densities are the same, relatively narrower beams may sometimes be considered more harmful than wider beams. As examples, various aspects may prevent mmW beams narrower than L3, mmW beams narrower than L2, etc., from being emitted. As one example, preventing the antenna array located away from the location of the ear speaker for the wireless device from emitting mmW beams having a beam width narrower than a threshold (e.g., narrower than L2, narrower than L3, etc.) may include modifying a codebook of the wireless device. Modifying the codebook of the wireless device may include removing beams narrower than the threshold (e.g., narrower than L2, narrower than L3, etc.) from the codebook and/or excluding beams narrower than the threshold (e.g., narrower than L2, narrower than L3, etc.).

In various aspects, preventing the antenna array located away from the location of an ear speaker for the wireless device from emitting mmW beams having a beam width narrower than a threshold may be performed in response to determining that the antenna array located away from the location of the ear speaker for the wireless device is available for mmW RF beaming. In various aspects, preventing the antenna array located away from the location of an ear speaker for the wireless device from emitting mmW beams having a beam width narrower than a threshold may be performed prior to adjusting a mmW carrier report to deprioritize usage of mmW.

Some aspects may include determining a first beam in use for mmW RF beaming is radiating in a direction associated with the user's head in response to determining an RF exposure condition for the wireless device is occurring during a voice call (e.g., a VoLTE call, a VoNR call, etc., whether the voice call is MO or MT) while the wireless device is operating in a mmW mode (e.g., ENDC, NRDC, etc.). In scenarios in which the current antenna array and the mmW beam in use are radiating directly in the direction of a user's head, identifying an alternate antenna array that can sound in the direction close to the current beam may reduce or avoid excessive exposure of the user's head to mmW RF transmissions. As examples, configuration settings, beam mappings, etc., may indicate whether a first beam in use for mmW RF beaming is radiating in a direction associated with the user's head.

Some aspects may include determining whether a second beam for mmW RF beaming emitted by the antenna array located away from the location of the ear speaker for the wireless device is a suitable substitute for the first beam. For example, when a second beam emitted in a different direction and from a different antenna array is a suitable substitute for the first beam in use for mmW RF beaming, mmW RF beaming may continue by switching to the second mmW RF beam while reducing or avoiding excessive exposure of the user's head to mmW RF transmissions.

In some aspects, determining a first beam in use for mmW RF beaming is radiating in a direction associated with the user's head and/or determining a second beam for mmW RF beaming emitted by the antenna array located away from the location of the ear speaker for the wireless device is a suitable substitute for the first beam may be performed in response to determining that the antenna array located away from the location of the ear speaker for the wireless device is available for mmW RF beaming. In some aspects, determining a first beam in use for mmW RF beaming is radiating in a direction associated with the user's head and/or determining a second beam for mmW RF beaming emitted by the antenna array located away from the location of the ear speaker for the wireless device is a suitable substitute for the first beam may be performed prior to adjusting a mmW carrier report to deprioritize usage of mmW.

In some aspects, the RF exposure condition may be a head adjacent usage condition. In other aspects, the RF exposure condition may be a usage condition associated with another sensitive area of a user, such as a user's heart, adjacent to a user's medical device, etc. In some aspects, the RF exposure condition for the wireless device may include one or more loud speakers of the wireless device being turned off and all handsfree type connections (e.g., Bluetooth headset connection, Universal Serial Bus (USB) headset connection, 3.5 millimeter (mm) headset connection, etc.) being inactive during the voice call. In some aspects, the RF exposure condition for the wireless device may include a user indication that an RF exposure condition is occurring, such as an indication of a user selection of an RF exposure avoidance mode, etc.

Some aspects may include outputting an indication to the user to initiate a mmW reprioritization action in response to determining an RF exposure condition for the wireless device is occurring during a voice call (e.g., a VoLTE call, a VoNR call, etc., whether the voice call is MO or MT) while the wireless device is operating in a mmW mode (e.g., ENDC, NRDC, etc.). In some scenarios, various operations described herein to reduce or avoid excessive mmW RF exposure may result in a potential performance degradation of a wireless device, such as data rate degradation, call quality reduction, etc. In some aspects, an indication to a user that mmW operations may be impacted or degraded may be provided to thereby prompt the user to pair a handsfree device and/or use a loud speaker of the wireless device to avoid a potential performance degradation resulting from mmW de-prioritization. As examples, outputting an indication to the user to initiate a mmW reprioritization action may include outputting a displayed indication to establish a handsfree connection, outputting a sound associated with handsfree connection availability, outputting a displayed indication to use a loud speaker of the wireless device for the voice call, outputting a displayed indication providing the option to forward the voice call to another wireless device, and/or any other type indication to the user to initiate a mmW reprioritization action. As examples, mmW reprioritization actions may include activating a handsfree connection (e.g., a Bluetooth headset connection, a USB headset connection, a 3.5 mm headset connection, etc.), turning on a loud speaker of the wireless device, and/or forwarding the voice call to another wireless device.

In some aspects, a user may affirmatively accept a potential performance degradation of a wireless device resulting from various operations described herein to reduce or avoid excessive mmW RF exposure. In some aspects, a user may indicate an acceptance of a mmW de-prioritization, such as by a button press, user interface interaction (e.g., swipe, drag, tap, etc.), etc. Some aspects may include determining whether a user indication of accepting mmW de-prioritization is received in response to outputting the indication to the user to initiate the mmW prioritization action. In response to determining that the user indication of accepting mmW de-prioritization is received, the wireless device may adjust a mmW carrier quality report to deprioritize usage of mmW.

Some aspects may include determining whether a mmW reprioritization action occurs within a time threshold after outputting an indication to a user to initiate a mmW reprioritization action. For example, the time threshold may be a period of seconds, such as 1 second, 5 seconds, 10 seconds, more than 10 seconds, etc. In various aspects, a wireless device may track the time since an indication to a user to initiate a mmW reprioritization occurred. In response to determining that a mmW prioritization action does not occur within the time threshold, a mmW carrier quality report may be adjusted to deprioritize usage of mmW in response to determining that a mmW prioritization action does not occur within the time threshold. The delay of adjusting a mmW carrier quality report to deprioritize usage of mmW until the time threshold is met or exceeded may give the user time to initiate a mmW reprioritization action before mmW usage is deprioritized.

Various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The terms "wireless device", "user equipment (UE)", and "UE computing device" are used interchangeably herein to refer to any one or all of cellular telephones, smartphones, portable computing devices, personal or mobile multimedia players, laptop computers, tablet computers, smartbooks, ultrabooks, palmtop computers, wireless electronic mail receivers, multimedia Internet-enabled cellular telephones, wireless router devices, wireless appliances, medical devices and equipment, entertainment devices (e.g., wireless gaming controllers, music and video players, satellite radios, etc.), wireless communication elements and wireless devices affixed to or incorporated into various mobile platforms, and similar electronic devices that include a memory, multiple SIMs, wireless communication components and a programmable processor.

The term "system-on-chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "SIM," "SIM card," and "subscriber identity module" may interchangeably refer to a memory that may be an integrated circuit or embedded into a removable card, and that stores an International Mobile Subscriber Identity (IMSI), related key, and/or other information used to identify and/or authenticate a wireless device on a network and enable a communication service with the network. Examples of SIMs include the Universal Subscriber Identity Module (USIM) provided for in the Long Term Evolution (LTE) 3GPP standard, and the Removable User Identity Module (R-UIM) provided for in the 3GPP standard. Universal Integrated Circuit Card (UICC) is another term for SIM. Moreover, a SIM may also refer to a virtual SIM (VSIM), which may be implemented as a remote SIM profile loaded in an application on a wireless device, and enabling normal SIM functions on the wireless device.

Because the information stored in a SIM enables the wireless device to establish a communication link for a particular communication service or services with a particular network, the term "SIM" is also be used herein as a shorthand reference to the communication service associated with and enabled by the information stored in a particular SIM as the SIM and the communication network, as well as the services and subscriptions supported by that network, correlate to one another. Similarly, the term SIM may also be used as a shorthand reference to the protocol stack and/or modem stack and communication processes used in establishing and conducting communication services with subscriptions and networks enabled by the information stored in a particular SIM.

As used herein, the terms "multi-SIM wireless device", "MS wireless device", "dual-SIM wireless device", and "DS wireless device" may interchangeably describe a wireless device that is configured with more than one SIM. Examples of multi-SIM wireless devices include multi-SIM multi-standby (MSMS) wireless devices, such as Dual-SIM (DS) dual-standby (DSDS) wireless devices, etc., and multi-SIM multi-active (MSMA) wireless devices, such as Dual-SIM dual-active (DSDA wireless devices, etc. An MSMS wireless device may be a wireless device that is configured with more than one SIM and allows idle-mode operations to be performed on two subscriptions simultaneously, as well as selective communication on one subscription while performing idle-mode operations on at least one other subscription. An MSMA wireless device may be a wireless device that is configured with more than one SIM and allows idle-mode and/or active mode operations to be performed on two subscriptions simultaneously using at least two different radio frequency (RF) resources (e.g., two different wireless transceivers).

The various aspects are described herein using the term "server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), IEEE 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

The terms "network operator," "operator," "mobile network operator," "carrier," and "service provider" are used interchangeably herein to describe a provider of wireless communications services that owns or controls elements to sell and deliver communication services to an end user, and provides necessary provisioning and credentials as policies implemented in user device subscriptions.

As used herein, the term "RF resource" refers to the components in a communication device that send, receive, and decode radio frequency signals. An RF resource typically includes a number of components coupled together that transmit RF signals that are referred to as a "transmit chain," and a number of components coupled together that receive and process RF signals that are referred to as a "receive chain."

LTE is a mobile network standard for 4G wireless communication of high-speed data developed by the 3GPP (3rd Generation Partnership Project) and specified in its Release 8 document series. The 5G system is an advanced technology from 4G LTE, and provides a new radio access technology (RAT) through the evolution of the existing mobile communication network structure. Implementations for 5G systems or networks are currently being adopted that provide new radio (NR) (also referred to a 5G) support via NR base stations, such as Next Generation NodeB (gNodeBs or gNBs)). The 5G systems and NR base stations are providing flexibility in bandwidth scheduling and utilization. Future generation systems (e.g., sixth generation (6G) or higher systems) may provide the same or similar flexibility in bandwidth scheduling and utilization.

In LTE and/or 5G (or later generation) systems network devices, such as base stations, may broadcast packets to wireless devices in a cell. For ease of reference, the term "network device" or "network computing device" is used to refer to any of a variety of network elements that may perform operations of various aspects, non-limiting examples of which include a base station, an eNodeB, a gNodeB, etc. Services may be provisioned to wireless devices in a cell using carriers of various frequencies, such as low frequencies (e.g., frequencies below 6 gigahertz (GHz), frequencies below 790 megahertz (MHz), etc.), high frequencies (e.g., frequencies between 6 GHz and 24 GHz, frequencies at or above 6 GHz and less than 24.25 GHz, etc.), or mmW frequencies (e.g., frequencies of 24.25 GHz or above, frequencies of 24.25 GHz to 52.6 GHz, frequencies of 52.6 GHz or above, etc.).

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" or "mmW" band in documents and articles, despite being different from the extremely high frequency (EHF) band (30 GHz-300 GHz) which is identified by the International Telecommunications Union (ITU) as a "millimeter wave" band. The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the Willi "sub-6 GHz" or the like if used herein may broadly represent frequencies that may be less than 6 GHz, may be within FR1, or may include mid-band frequencies. Further, unless specifically stated otherwise, it should be understood that the tell is "millimeter wave" and/or "mmW" or the like if used herein may broadly represent frequencies that may include mid-band frequencies, may be within FR2, FR4, FR4-a or FR4-1, and/or FR5, or may be within the EHF band.

FIG. 1 is a system block diagram illustrating an example communication system 100 suitable for implementing any of the various aspects. The communications system 100 may be a 5G New Radio (NR) network, or any other suitable network such as an LTE network, 5G network, etc. While FIG. 1 illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of wireless devices (illustrated as UEs 120 in FIG. 1). The communications system 100 may also include a number of base stations (illustrated as the BS 110, the BS 110b, the BS 110c, and the BS 110d) and other network entities. A base station is an entity that communicates with wireless devices, and also may be referred to as a Node B, an LTE Evolved nodeB (eNodeB or eNB), an access point (AP), a Radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station Subsystem serving this coverage area, or a combination thereof, depending on the context in which the term is used. The core network 140 may be any type core network, such as an LTE core network (e.g., an Evolved Packet Core (EPC) network), 5G core network, etc.

A base station 110-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110 may be a macro BS for a macro cell 102a, a base station 110b may be a pico BS for a pico cell 102b, and a base station 110c may be a femto BS for a femto cell 102c. A base station 110-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110-110d may communicate with the core network 140 over a wired or wireless communication link 126. The wireless devices 120 may communicate with the base station 110-110d over a wireless communication link 122. In some implementations, the base station 110 may be a non-mmW cell (e.g., LTE cell, Sub-6 GHz cell, etc.). In some implementations, the base station 110 may be a mmW cell (e.g., a gNB operating at mmW frequencies). In scenarios in which the base station 110 is a mmW cell, the base station 110 may utilize beamforming for communications with the wireless device 120. In a similar manner, the wireless device 120 may utilize beamforming for communications with the base station 110. The base station 110 may transmit a beamformed signal, such as a mmW beam, in one or more transmit directions 122b. The wireless device 120 may receive the beamformed signal from the base station 110 in one or more receive directions 122a. The wireless device 120 may transmit a beamformed signal, such as a mmW beam, in one or more transmit directions. The base station 110 may receive the beamformed signal from the wireless device in one or more receive directions. The base station 110 and/or wireless device 120 may perform beam training and configuration operations to select receive and/or transmit beam directions for each of the base station 110 and/or wireless device 120. The transmit and receive directions for the base station 110 and/or wireless device 120 may be the same or the transmit and receive directions for the base station 110 and/or wireless device 120 may be different.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and transmit the data to a downstream station (for example, a wireless device or a base station). A relay station also may be a mobile device that can relay transmissions for other wireless devices. In the example illustrated in FIG. 1, a relay station 110d may communicate with macro the base station 110 and the wireless device 120 in order to facilitate communication between the base station 110 and the wireless device 120. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120 may be dispersed throughout communications system 100, and each wireless device may be stationary or mobile. A wireless device also may be referred to as an access terminal, a terminal, a mobile station, a subscriber unit, a station, user equipment (UE), etc.

A macro base station 110 may communicate with the communication network 140 over a wired or wireless communication link 126. The wireless devices 120 may communicate with a base station 110-110d over a wireless communication link 122.

The wireless communication links 122, 124 may include a plurality of carrier signals, frequencies, or frequency bands, each of which may include a plurality of logical channels. The wireless communication links 122 and 124 may utilize one or more Radio access technologies (RATs). Examples of RATs that may be used in a wireless communication link include 3GPP LTE, 3G, 4G, 5G (e.g., NR), GSM, CDMA, WCDMA, Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum Resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 Resource blocks), and there may be 1, 2, 4, 8 or 16 subbands for system bandwidth of 1.25, 2.5, 5, 10 or 20 MHz, respectively.

While descriptions of some aspects may use terminology and examples associated with LTE technologies, some aspects may be applicable to other wireless communications systems, such as a new Radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR Resource blocks may span 12 sub-carriers with a sub-carrier bandwidth of 75 kHz over a 0.1 millisecond (ms) duration. Each Radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or Evolved or enhanced machine-type communication (eMTC) mobile devices. MTC and eMTC mobile devices include, for example, robots, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A wireless device 120 may be included inside a housing that houses components of the wireless device, such as processor components, memory components, similar components, or a combination thereof.

In general, any number of communication systems and any number of wireless networks may be deployed in a given geographic area. Each communications system and wireless network may support a particular Radio access technology (RAT) and may operate on one or more frequencies. A RAT also may be referred to as a Radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

In some aspects, two or more wireless devices 120 may communicate directly using one or more sidelink channels 124 (for example, without using a base station 110-110d as an intermediary to communicate with one another). For example, wireless devices 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless devices 120 may perform scheduling operations, resource selection operations, as well as other operations described elsewhere herein as being performed by the base station 110.

In the example illustrated in FIG. 1, wireless devices 120 may include a mmW RF exposure manager 101. In various aspects, the mmW RF exposure manager 101 may be configured to perform operations for reducing (or avoiding) excessive mmW RF exposure to a user of the wireless device 120 as described herein, such as described with reference to FIGS. 4A and 5-16. In various aspects, the mmW RF exposure manager 101 may be configured to determine an RF exposure condition for the wireless device 120 is occurring while the wireless device 120 is operating in a mmW mode (e.g., ENDC, NRDC, etc.) during a voice call (e.g., a VoLTE call, a VoNR call, etc., whether the voice call is MO or MT). In various aspects, the mmW RF exposure manager 101 may be configured to adjust a mmW carrier quality report to deprioritize usage of mmW in response to determining that the RF exposure condition for the wireless device 120 is occurring during the voice call.

Figure 2:
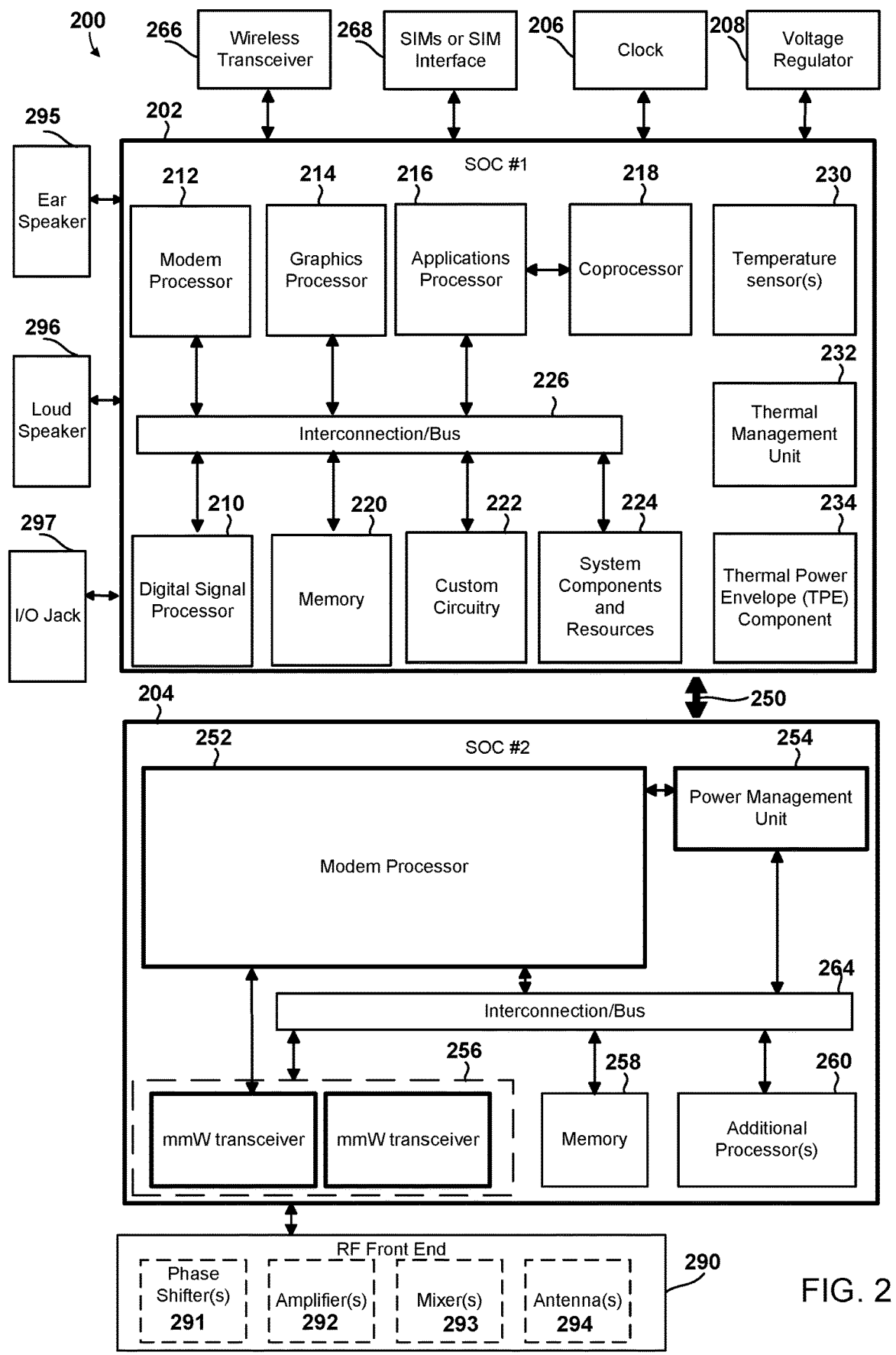
FIG. 2 is a component block diagram illustrating an example computing and wireless modem system in accordance with various aspects of the present disclosure.

FIG. 2 is a component block diagram illustrating an example computing and wireless modem system 200 suitable for implementing any of the various aspects. Various aspects may be implemented on a number of single processor and multiprocessor computer systems, including a system-on-chip (SOC) or system in a package (SIP).

With reference to FIGS. 1 and 2, the illustrated example wireless device 200 (which may be a SIP in some aspects) includes two SOCs 202, 204 coupled to a clock 206, a voltage regulator 208, at least one SIM 268 and/or a SIM interface, a wireless transceiver 266, an ear speaker 295, a loud speaker 296, an input/output (IO) jack 297 (e.g., a 3.5 mm jack, a USB jack, etc.), and an RF front end 290. The RF front end 290 may include various components configured to support sending and receiving wireless communications to/from other devices, such as a base station 110. For example, the RF front end 290 may include one or more phase shifters 291, one or more amplifiers 292, one or more mixers 293, and/or one or more antennas 294. In some aspects, the first SOC 202 may operate as central processing unit (CPU) of the wireless device that carries out the instructions of software application programs by performing the arithmetic, logical, control and input/output (I/O) operations specified by the instructions. In some aspects, the second SOC 204 may operate as a specialized processing unit. For example, the second SOC 204 may operate as a specialized 5G processing unit responsible for managing high volume, high speed (e.g., 5 Gbps, etc.), and/or mmW RF communications.

The first SOC 202 may include a digital signal processor (DSP) 210, a modem processor 212, a graphics processor 214, an application processor (AP) 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a modem processor 252, such as a 5G modem processor, etc., a power management unit 254, an interconnection/bus module 264, the plurality of mmW transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmW transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206, a voltage regulator 208, one or more wireless transceivers 266, at least one SIM 268 and/or SIM interface (i.e., an interface for receiving one or more SIM cards), ear speaker 295, loud speaker 296, IO jack 297, and RF front end 290. Resources external to the SOC (e.g., clock 206, voltage regulator 208, wireless transceiver 266, SIM 268 or SIM interface, ear speaker 295, RF front end 290, and loud speaker 296) may be shared by two or more of the internal SOC processors/cores. The at least one SIM 268 (or one or more SIM cards coupled to one or more SIM interfaces) may store information supporting multiple subscriptions, including a first 5GNR subscription and a second 5GNR subscription, a first 5GNR subscription and an LTE subscription, etc. In some configurations, the one or more wireless transceivers 266 may establish wireless type handsfree connections (e.g., Bluetooth, ANT, etc. connections) with handsfree devices (e.g., a standalone speaker, a headset, an earpiece, smart home device, wearable device, etc.). In some configurations, the I/O jack 297 may receive one or more plugs (e.g., a 3.5 mm plug, USB plug, etc.) to establish wired type handsfree connections (e.g., 3.5 mm headset connection, USB connection, etc.) with handsfree devices (e.g., a speaker, a headset, etc.).

In addition to the example SIP 200 discussed above, various aspects may be implemented in a wide variety of computing systems, which may include a single processor, multiple processors, multicore processors, or any combination thereof.

Figure 3:
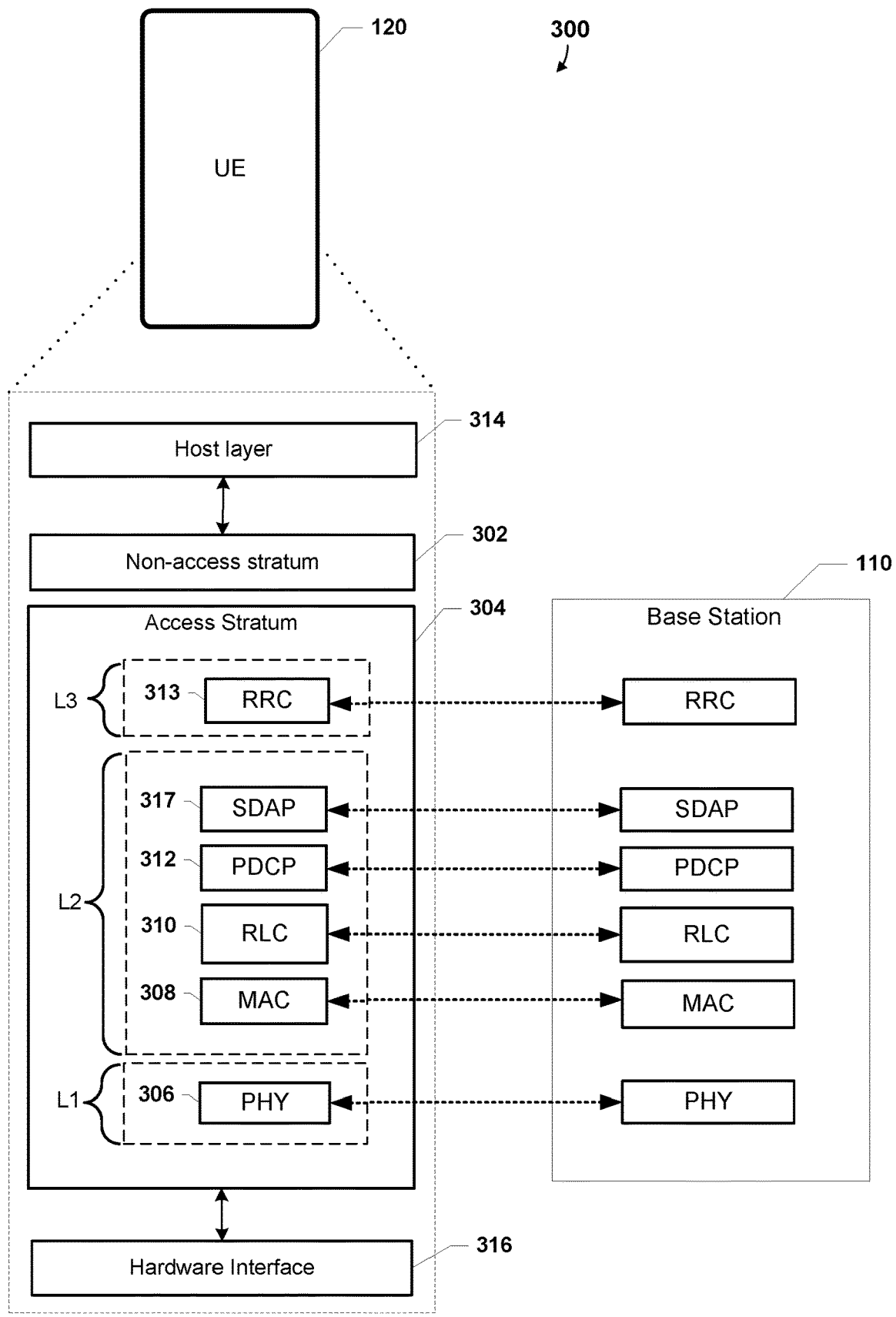
FIG. 3 is a diagram illustrating an example of a software architecture including a radio protocol stack for the user and control planes in wireless communications in accordance with various aspects of the present disclosure.

FIG. 3 illustrates an example of a software architecture 300 including a radio protocol stack for the user and control planes in wireless communications between a base station 110 (e.g., the base station 110) and a wireless device (UE computing device) 120 (e.g., the wireless device 200). With reference to FIGS. 1-3, the wireless device 120 may implement the software architecture 300 to communicate with the base station 110 of a communication system (e.g., 100). In various aspects, layers in software architecture 300 may form logical connections with corresponding layers in software of the base station 110. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 120 and the base station 110 over the physical layer 306. In the various aspects, Layer 2 may include a media access control (MAC) sublayer 308, a radio link control (RLC) sublayer 310, and a packet data convergence protocol (PDCP) 312 sublayer, and a Service Data Adaptation Protocol (SDAP) 317 sublayer, each of which form logical connections terminating at the base station 110.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various aspects, the RRC sublayer 313 may provide functions including broadcasting system information, paging, and establishing and releasing an RRC signaling connection between the wireless device 120 and the base station 110.

In various aspects, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 120. In some aspects, application-specific functions provided by the at least one host layer 314 may provide an interface between the software architecture and the general purpose processor 206.

In other aspects, the software architecture 300 may include one or more higher logical layer (e.g., transport, session, presentation, application, etc.) that provide host layer functions. For example, in some aspects, the software architecture 300 may include a network layer (e.g., Internet Protocol (IP) layer) in which a logical connection terminates at a packet data network (PDN) gateway (PGW). In some aspects, the software architecture 300 may include an application layer in which a logical connection terminates at another device (e.g., end user device, server, etc.). In some aspects, the software architecture 300 may further include in the AS 304 a hardware interface 316 between the physical layer 306 and the communication hardware (e.g., one or more radio frequency (RF) transceivers).

Figure 4A:
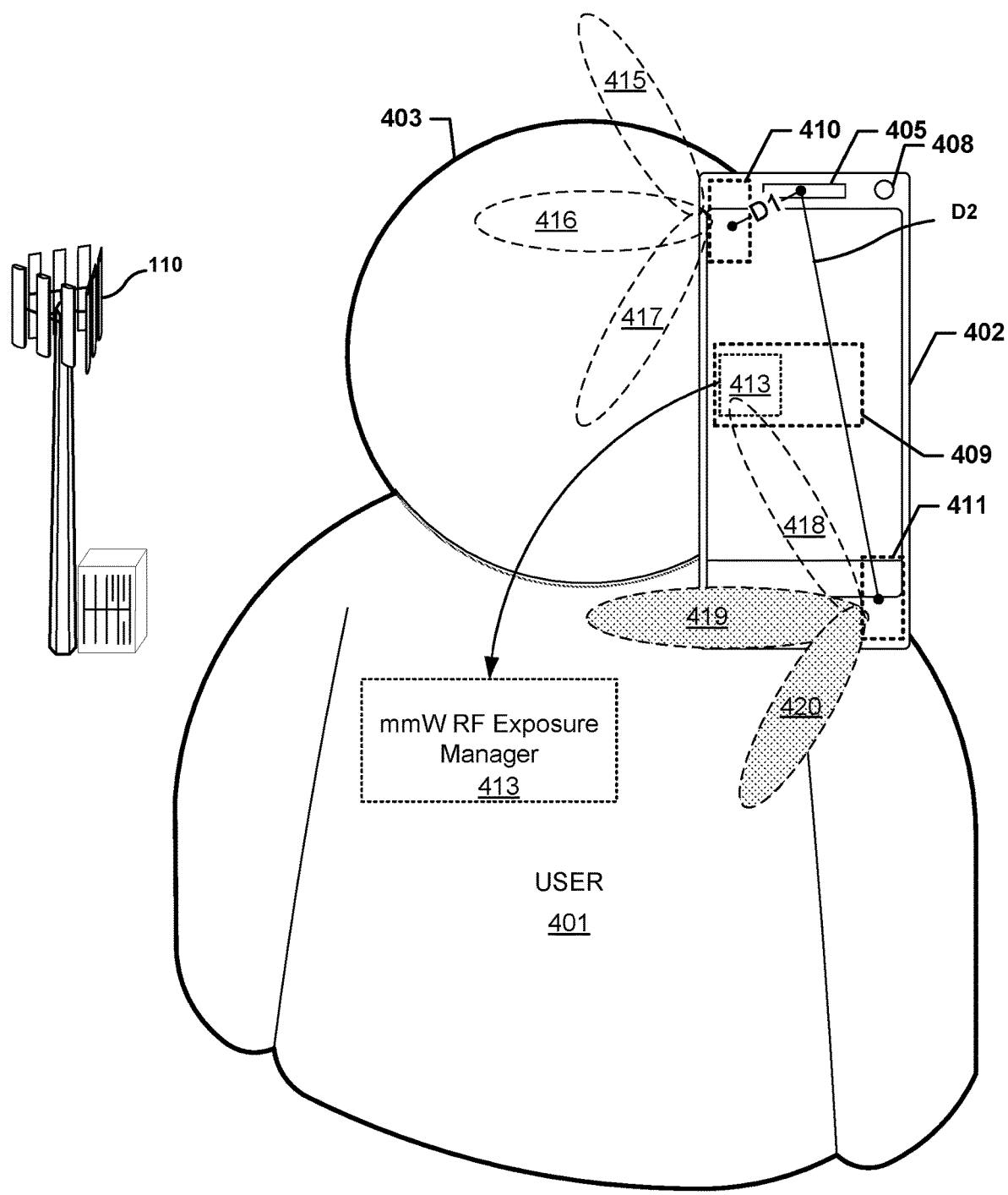
FIG. 4A is a diagram illustrating example interactions between a wireless device, a user, and a base station in accordance with aspects of the present disclosure.

FIG. 4A illustrates example interactions between a wireless device 402 (e.g., wireless device 120, 200), a user 401 of the wireless device 402, and a base station 110 in accordance with aspects of the present disclosure. With reference to FIGS. 1-4A, the wireless device 402 is illustrated in FIG. 4A in a position next to a head 403 of the user 401. The wireless device 402 may be so positioned next to the head 403 of the user 401 during a voice call (e.g., a VoLTE call, a VoNR call, etc., whether the voice call is MO or MT) established with the base station 110 to generally align an ear of the user 401 with an ear speaker 405 (e.g., ear speaker 295) of the wireless device 402. Alternatively, the user 401 may move the wireless device 402 to a different position, such as a position away from their head 403 when a loud speaker 408 (e.g., loud speaker 296) of the wireless device 402 is turned on or a hands free connection (e.g., a Bluetooth headset connection, a USB headset connection, a 3.5 mm headset connection, etc.) is active. The ear speaker 405 and loud speaker 408 may be connected to a processor 409 (e.g., processor 210, 212, 214, 216, 218, 252, 260) of the wireless device 402. The processor 409 may control the operations of the ear speaker 405 and the loud speaker 408. For example, the processor 409 may turn the ear speaker 405 and/or the loud speaker 408 on or off.

In some configurations, the wireless device 402 may include multiple antenna arrays, such as an antenna array 410 located near the ear speaker 405 and an antenna array 411 located away from the location of the ear speaker 405. The antenna array 411 located away from the location of the ear speaker 405 may be the antenna array 411 located a farther distance, such as distance D2, from the location of the ear speaker 405 than the antenna array 410 which may be a shorter distance D1 from the location of the ear speaker 405. As one example, the relative distances D1 and D2 from the ear speaker 405 position may be values associated with the antenna arrays 410, 411 in a memory. Specifically, the relative distances D1 and D2 from the ear speaker 405 position may be pre-provisioned configuration attributes provided to the processor 409 of the wireless device 402 at the time of manufacture. The antenna arrays 410, 411 may be connected to the processor 409. The processor 409 may control the operations of the antenna arrays 410, 411.

The wireless device 402 may include a mmW RF exposure manager 413 (e g, mmW RF exposure manager 101) that may be configured to perform operations for reducing (or avoiding) excessive mmW RF exposure to a user of the wireless device 120 as described herein, such as described with reference to FIGS. 1 and 5-16. For example, the mmW RF exposure manager 413 may run on the processor 409 of the wireless device 402. In various aspects, the mmW RF exposure manager 413 may be configured to determine an RF exposure condition for the wireless device 402 is occurring while the wireless device 402 is operating in a mmW mode (e.g., ENDC, NRDC, etc.) during a voice call (e.g., a VoLTE call, a VoNR call, etc., whether the voice call is MO or MT). In various aspects, the mmW RF exposure manager 413 may be configured to adjust a mmW carrier quality report to deprioritize usage of mmW in response to determining that the RF exposure condition for the wireless device 402 is occurring during the voice call. As one example, the mmW RF exposure manager 413 may adjust a mmW carrier quality report to deprioritize usage of mmW by setting a CQI for a mmW carrier to zero in a CSI report. In this manner, regardless of the actual CQI determined for the mmW carrier, the CSI report may be adjusted to indicate the mmW carrier has a worst possible quality of zero. As another example, the mmW RF exposure manager 413 may adjust a mmW carrier quality report to deprioritize usage of mmW by including an indication that mmW cells are unreachable.

During a voice call in a mmW mode of operation, the antenna array 410 may attempt mmW RF beaming with mmW beams 415, 416, and/or 417. Each of the mmW beams 415, 416, and 417 may be emitted by the antenna array 410 in different directions to support mmW communications with the base station 110. Similarly, during a voice call in a mmW mode of operation, the antenna array 411 may attempt mmW RF beaming with mmW beams 418, 419, and/or 420. Each of the mmW beams 418, 419, and 420 may be emitted by the antenna array 411 in different directions to support mmW communications with the base station 110. As illustrated in FIG. 4A, mmW beams 415, 416, and 417 may be emitted into the head 403 of the user 401 from antenna array 410 when the wireless device 409 is held to an ear of the user 401.

As illustrated in FIG. 4A, mmW beam 418 may be emitted into the head 403 of the user 401 from antenna array 411 when the wireless device 409 is held to the ear of the user 401, while mmW beams 419 and 420 may not be emitted into the head 403 of the user 401 from antenna array 411 when the wireless device 409 is held to the ear of the user 401 as the antenna array 411 may be located farther from the ear speaker 405 than antenna array 410. As mmW beams 416 and 419 are in similar directions, mmW beams 416 and 419 may be suitable substitutes for one another. As mmW beams 417 and 420 are in similar directions, mmW beams 417 and 420 may be suitable substitutes for one another.

In response to determining that an RF exposure condition for the wireless device 402 is occurring during a voice call (e.g., a VoLTE call, a VoNR call, etc., whether the voice call is MO or MT) in a mmW mode of operation (e.g., ENDC, NRDC, etc.), the mmW RF exposure manager 413 may determine whether the antenna array 411 located away from the location of the ear speaker 405 is available for mmW RF beaming. As example, the availability of an antenna array 411 located away from a location of the ear speaker 405 for the wireless device 402 is available for mmW RF beaming may be based on configuration settings of the wireless device 402, status checks of antenna arrays 410, 411 of the wireless device 402, user settings, operating modes of the wireless device 402, and/or any other criteria that may indicate whether or not the antenna array 411 is available for mmW RF beaming. In response to determining that the antenna array 411 located away from the location of the ear speaker 405 for the wireless device 402 is available for mmW RF beaming, the mmW RF exposure manager 413 may prevent the antenna array 410 from emitting mmW beams 415, 416, and 417. In response to determining that the antenna array 411 located away from the location of the ear speaker 405 for the wireless device 402 is available for mmW RF beaming, the mmW RF exposure manager 413 may prevent the antenna array 411 from emitting mmW beams having a beam width narrower than a threshold. In response to determining that the antenna array 411 located away from the location of the ear speaker 405 for the wireless device 402 is not available for mmW RF beaming, the mmW RF exposure manager 413 may adjust a mmW carrier quality report to deprioritize usage of mmW.

In response to determining that an RF exposure condition for the wireless device 402 is occurring during a voice call (e.g., a VoLTE call, a VoNR call, etc., whether the voice call is MO or MT) in a mmW mode of operation (e.g., ENDC, NRDC, etc.), the mmW RF exposure manager 413 may determine whether a first beam in use for mmW RF beaming, such as mmW beam 416, is radiating in a direction associated with the head 403 of the user 401. In response to determining that the first beam, such as mmW beam 416, in use for mmW RF beaming is radiating in the direction associated with head 403 of the user 401, the mmW RF exposure manager 413 may determine whether the antenna array 411 located away from the location of the ear speaker 405 is available for mmW RF beaming. As example, the availability of an antenna array 411 located away from a location of the ear speaker 405 for the wireless device 402 is available for mmW RF beaming may be based on configuration settings of the wireless device 402, status checks of antenna arrays 410, 411 of the wireless device 402, user settings, operating modes of the wireless device 402, and/or any other criteria that may indicate whether or not the antenna array 411 is available for mmW RF beaming. In response to determining that the antenna array 411 located away from the location of the ear speaker 405 for the wireless device 402 is available for mmW RF beaming, the mmW RF exposure manager 413 may determine whether a second beam, such as mmW beam 419, for mmW RF beaming emitted by the antenna array 411 located away from the location of the ear speaker 405 for the wireless device 402 is a suitable substitute for the first beam, such as mmW beam 416. In some scenarios, the second beam for mmW RF beaming, such as mmW beam 419, emitted by the antenna array 411 located away from the location of the ear speaker 405 for the wireless device 402 may be emitted in a direction different from the first beam, such as mmW beam 416. In response to determining that a second beam, such as mmW beam 419, for mmW RF beaming emitted by the antenna array 411 located away from the location of the ear speaker 405 for the wireless device 402 is a suitable substitute for the first beam, such as mmW beam 416, the mmW RF exposure manager 413 may switch to the second beam, such as mmW beam 419, for mmW RF beaming emitted by the antenna array 411 located away from the location of the ear speaker 405 for the wireless device 402 for mmW operations.

In response to determining that the first beam, such as mmW beam 416, in use for mmW RF beaming is not radiating in the direction associated with head 403 of the user 401, the mmW RF exposure manager 413 may adjust a mmW carrier quality report to deprioritize usage of mmW. In response to determining that the antenna array 411 located away from the location of the ear speaker 405 for the wireless device 402 is not available for mmW RF beaming, the mmW RF exposure manager 413 may adjust a mmW carrier quality report to deprioritize usage of mmW. In response to determining that a second beam, such as mmW beam 419, for mmW RF beaming emitted by the antenna array 411 located away from the location of the ear speaker 405 for the wireless device 402 is not a suitable substitute for the first beam, such as mmW beam 416, the mmW RF exposure manager 413 may adjust a mmW carrier quality report to deprioritize usage of mmW.

In response to determining that an RF exposure condition for the wireless device 402 is occurring during a voice call (e.g., a VoLTE call, a VoNR call, etc., whether the voice call is MO or MT) in a mmW mode of operation (e.g., ENDC, NRDC, etc.), the mmW RF exposure manager 413 may output an indication to the user 401 to initiate a mmW reprioritization action. The mmW RF exposure manager 413 may determine whether the mmW reprioritization action occurs within a time threshold after outputting the indication to the user 401 to initiate the mmW reprioritization action. As examples, a mmW reprioritization action may include turning on the loud speaker 408 of the wireless device 402, activating a handsfree type connection (e.g., a Bluetooth headset connection, a USB headset connection, a 3.5 mm headset connection, etc.). As examples, the time threshold may be a period of time, such as a number of seconds (e.g., 1 second, 2 seconds, 5 seconds, etc.) configured to give the user 401 a chance to take a mmW reprioritization action before deprioritizing usage of mmW. In response to determining that a mmW prioritization action does not occur within the time threshold, the mmW RF exposure manager 413 may adjust a mmW carrier quality report to deprioritize usage of mmW. In response to outputting the indication to the user 401 to initiate the mmW prioritization action, the mmW RF exposure manager 413 may determine whether a user 401 indication of accepting mmW de-prioritization is received. As examples, a user 401 may indicate an acceptance of a mmW de-prioritization by a button press, user interface interaction (e.g., swipe, drag, tap, etc.), etc. In response to determining that the user 401 indication of accepting mmW de-prioritization is received, the mmW RF exposure manager 413 may adjust a mmW carrier quality report to deprioritize usage of mmW.

Figure 4B:
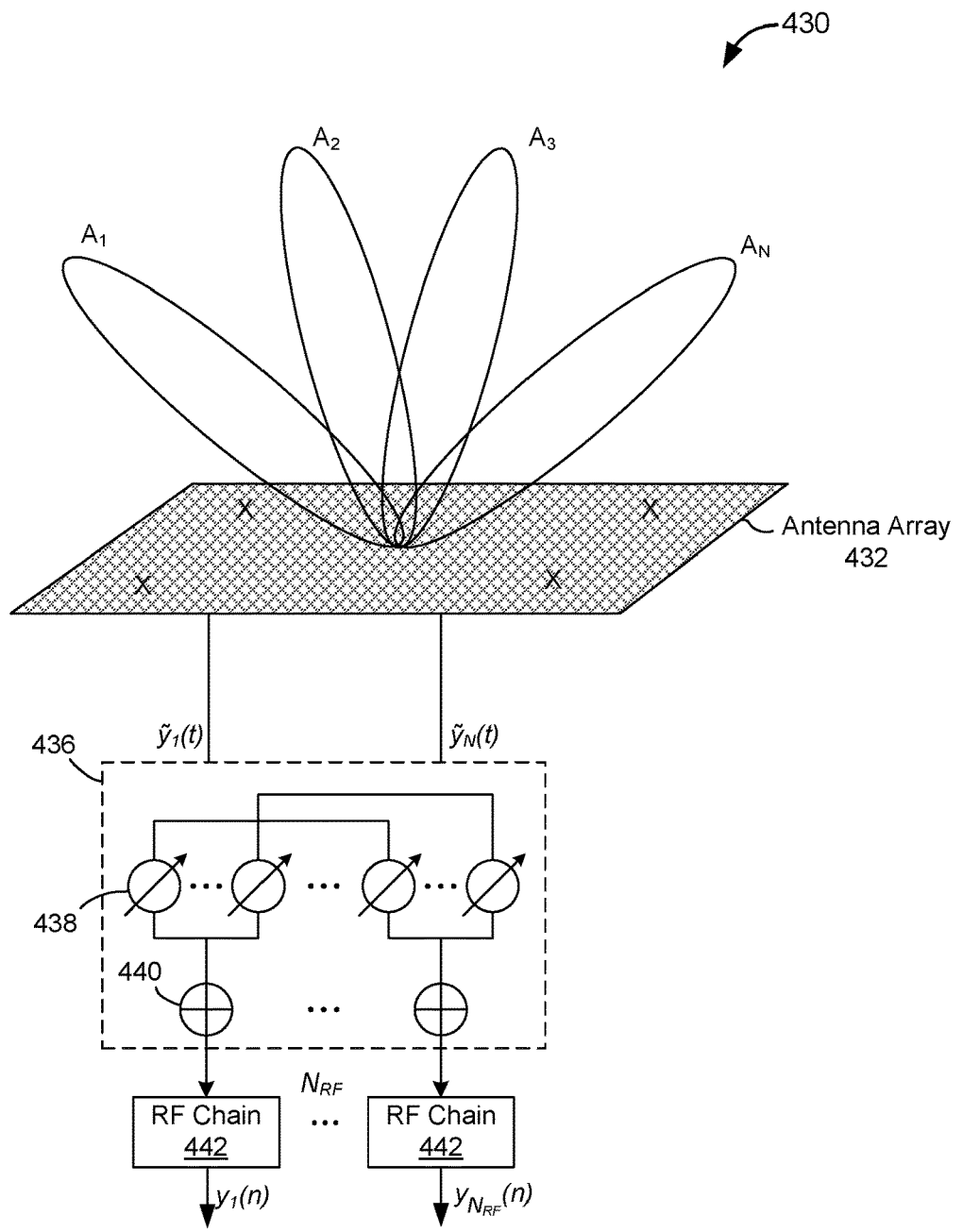
FIG. 4B is a component block diagram illustrating an example millimeter wave (mmW) receiver in accordance with various aspects of the present disclosure.
Figure 4C:
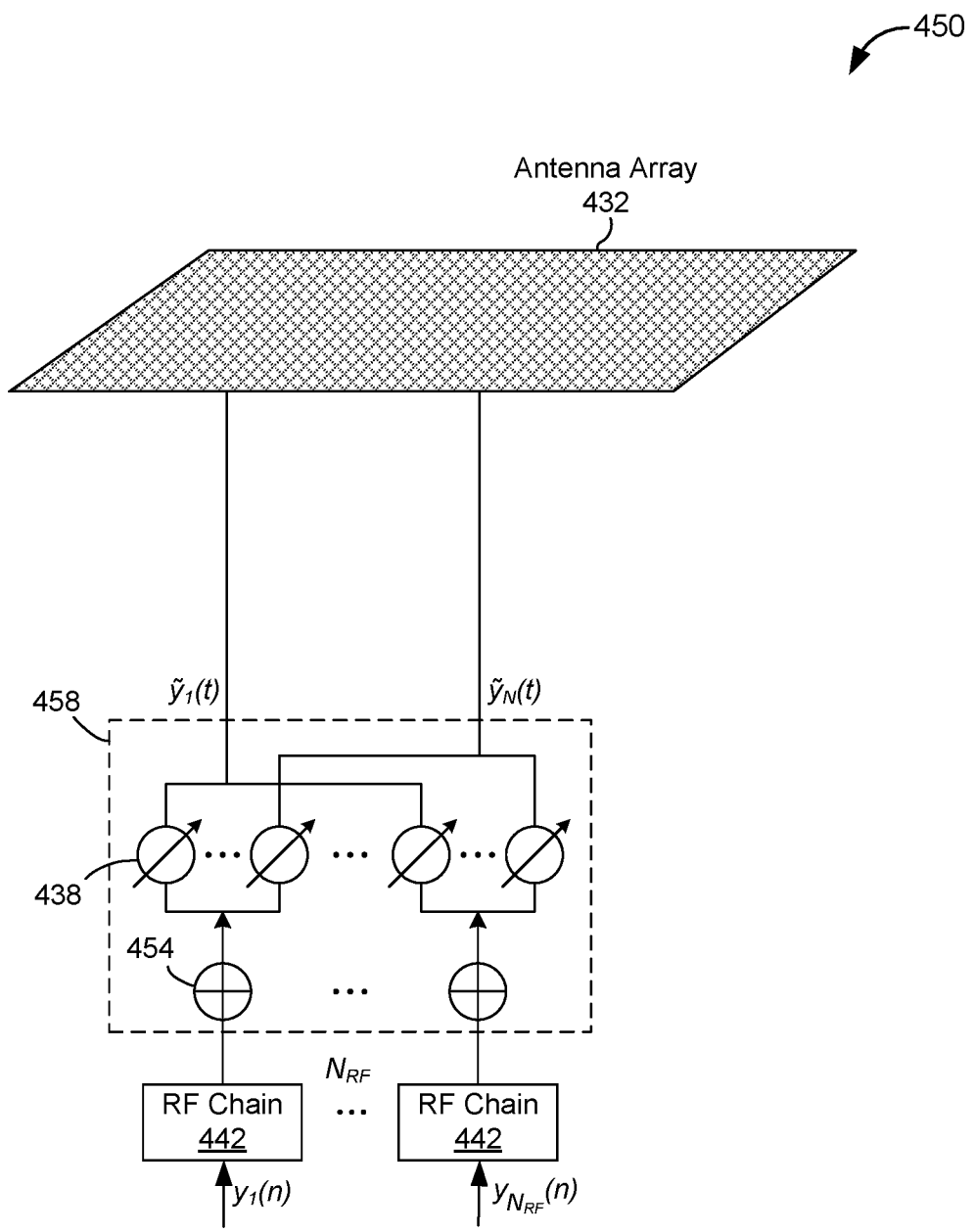
FIG. 4C is a component block diagram illustrating an example mmW transmitter in accordance with various aspects of the present disclosure.

FIG. 4B is a component block diagram illustrating a mmW receiver 430, and FIG. 4C is a component block diagram illustrating a mmW transmitter 450, suitable for use with various aspects. The mmW receiver 430 and the mmW transmitter 450 may also be referred to as beamforming architectures. With reference to FIGS. 1-4C, the mmW receiver 430 and the mmW transmitter 450 may be used in a wireless device (e.g., 120, 200) or a base station (e.g., 110-110d, 200, 110).

In various aspects, a wireless device may be configured with both the mmW receiver 430 and the mmW transmitter 450 (i.e., with both architectures), and may use either or both. As an example, the mmW receiver 430 architecture and the mmW transmitter 450 architecture may be portions of the mmW transceivers 256 and/or RF front end 290. Implementing a wireless device with multiple architectures addresses limitations of a single static architecture. One architecture may be efficient (e.g., use an appropriate spectral efficiency, resolution, and/or power consumption and/or the like) for a first set of communications and another architecture may be efficient for a second set of communications. In contrast, static selection of a single architecture may cause inefficient utilization of computing, communication, network, and/or power resources by using the single architecture to transmit and/or receive communications.

Referring to FIG. 4B, the mmW receiver 430 includes an antenna array 432 (e.g., antenna 294, 410, 411) of a plurality of antenna elements included within one or more antenna panels. In FIG. 4B, the value "N" represents the number of antenna elements in the antenna array 432. The antenna array 432 may include a plurality of cross-polarized antennas (each symbolized by an "X"). In some aspects, the wireless device may be configured with four dual-pole antennas (i.e., eight in total). Based on a selected beamforming codebook, which may be translated into a set of phase shifts in an analog beamforming block, the wireless device may form beams $A_1$ up to $A_N$.

A mmW receiver 430 may be configured to perform analog or hybrid beamforming. A signal $\tilde{y}_N(t)$ received at an antenna N of the antenna array 432 at a time t may propagate to a hybrid beamforming circuit 436. Hybrid beamforming may be performed in RF or at an intermediate frequency (IF) through the hybrid beamforming circuit 436. The hybrid beamforming circuit 436 may include a bank of phase shifters 438 (e.g., phase shifter 291) and a summer 440 connected to some of the antenna elements. While analog and hybrid beamforming techniques are generally power efficient, they are only capable of receiving in a few directions. If a mmW signal is received outside of an analog beam supported by the mmW receiver 430, degradation in signal quality or even beam failure may be experienced.

A mmW receiver 430 suitable for use with various aspects may be configured to perform analog or hybrid beamforming. The mmW receiver 430 may perform beamforming in baseband frequencies. In the mmW receiver 430, the number of antenna elements (e.g., 1-N) of the antenna array 432 may correspond to the number of RF chains 442 (e.g., $1-N_{RF}$). In some aspects, the wireless device may be configured with high-resolution ADCs (one per RF chain).

Referring to FIG. 4C, the mmW transmitter 450 may include the antenna array 432 of a plurality of antenna elements included within one or more antenna panels. The mmW transmitter 450 may include a hybrid beamforming circuit 458 that may receive n signals from N RF chains 442. The hybrid beamforming circuit 458 may include a band of summers 454 and a bank of phase shifters 438. A hybrid beamforming circuit 458 may propagate a signal $\tilde{y}_N(t)$ to an antenna N of the antenna array 432.

Figure 5:
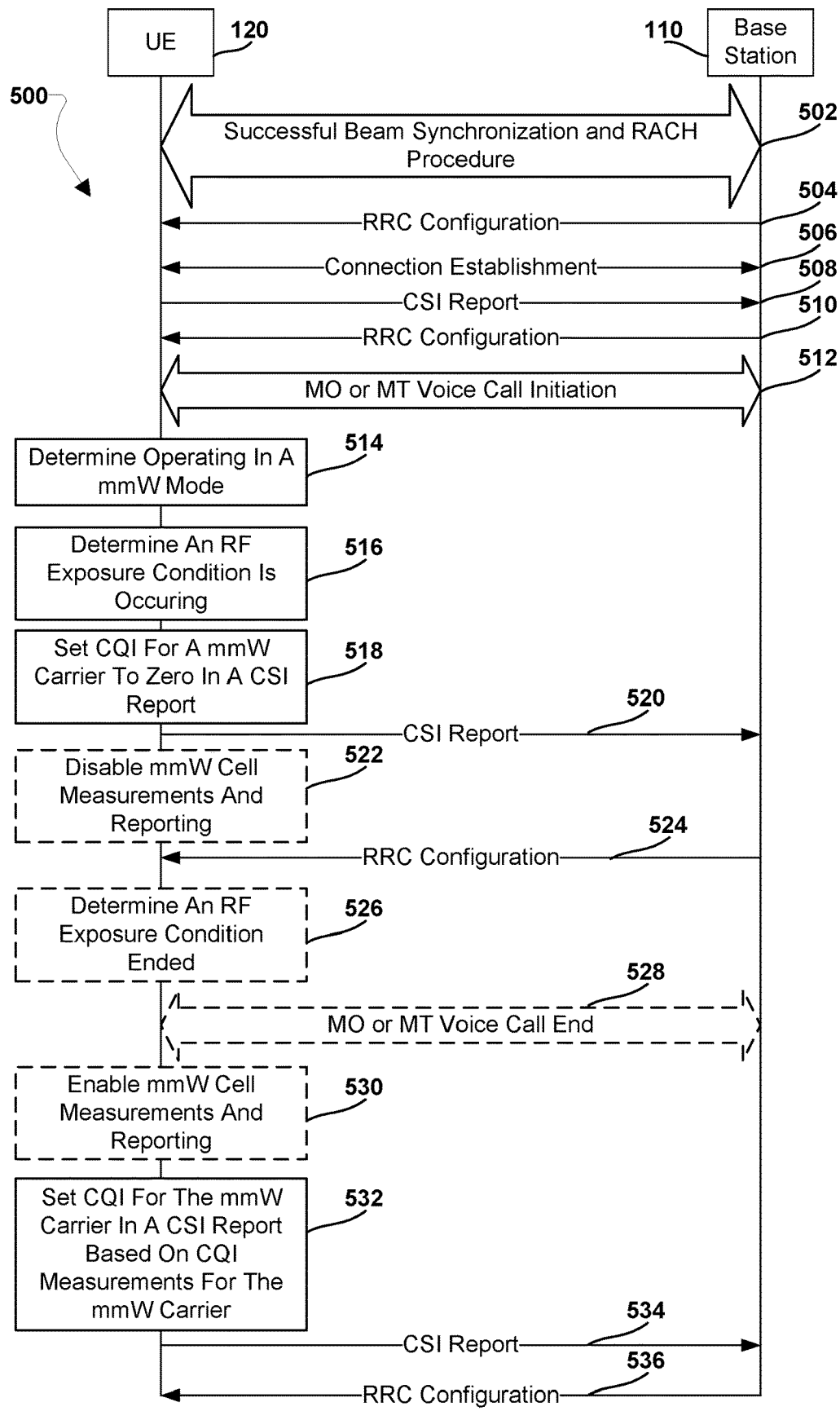
FIG. 5 is a call-flow diagram illustrating example operations to reduce (or avoid) excessive mmW radio frequency (RF) exposure to a user of a wireless device in accordance with one aspect of the present disclosure.

FIG. 5 illustrates example operations of a process flow 500 that supports reducing (or avoiding) excessive mmW radio frequency (RF) exposure to a user (e.g., user 401) of a wireless device (e.g., 120, 200, 402) according to various aspects. With reference to FIGS. 1-5, process flow 500 may include base station 110 and wireless device 120.

At 502, the wireless device 120 and base station 110 may complete a successful beam synchronization and random access channel (RACH) procedure with one another to establish mmW communications. At 504, the base station 110 may send a RRC configuration to the wireless device 120. The RRC configuration may include a listing of cells, such as mmW cells and non-mmW cells (e.g., LTE cells, Sub-6 GHz cells, etc.) for use by the wireless device 120 in a mmW mode of operation. At 506, the wireless device 120 and base station 110 may establish a connection with one another.

At 508, the wireless device 120 may send a CSI report to the base station 110. The CSI report may include values of CQI measurements for the carriers available from the cells received in the RRC configuration, such as mmW carriers, LTE carriers, etc., made by the wireless device 120. At 510, the base station 110 may send an updated RRC configuration to the wireless device 120. The updated RRC configuration may include a modified listing of cells, such as mmW cells and non-mmW cells (e.g., LTE cells, Sub-6 GHz cells, etc.), with cells in the list added or removed based on the CSI report from the wireless device 120. In this manner, based on the CQI measurements by the wireless device 120, the base station 110 may modify the cells available to the wireless device 120.

At 512, a MO or MT voice call (e.g., a Voice over LTE (VoLTE) call, a Voice over NR (VoNR) call, etc.) may be initiated. At 514, the wireless device 120 may determine the wireless device 120 is operating in a mmW mode. As examples, the wireless device 120 may determine whether a current operating mode setting reflects a mmW mode (e.g., ENDC, NRDC, etc.) to determine whether the wireless device 120 is operating in a mmW mode or may determine whether mmW cells are assigned to the wireless device 120 to determine whether the wireless device 120 is operating in a mmW mode.

At 516, the wireless device 120 may determine an RF exposure condition is occurring. In some aspects, the RF exposure condition may be a head adjacent usage condition. In other aspects, the RF exposure condition may be a usage condition associated with another sensitive area of a user, such as a user's heart, adjacent to a user's medical device, etc. In some aspects, the RF exposure condition for the wireless device 120 may include one or more loud speakers (e.g., 296, 408) of the wireless device 120 being turned off and all handsfree type connections (e.g., Bluetooth headset connection, USB headset connection, 3.5 mm headset connection, etc.) being inactive during the voice call. In some aspects, the RF exposure condition for the wireless device 120 may include a user indication that an RF exposure condition is occurring, such as an indication of a user selection of an RF exposure avoidance mode, etc. The wireless device 120 may determine whether an RF exposure condition is occurring by determining the states of devices associated with various RF exposure conditions and determining whether the states match RF exposure conditions.

At 518, the wireless device may set a CQI for a mmW carrier to zero in a CSI report. In this manner, regardless of the actual CQI determined for the mmW carrier, the CSI report may be adjusted to indicate the mmW carrier has a worst possible quality of zero.

At 520, the wireless device 120 may send the CSI report to the base station 110. Optionally at 522, the wireless device 120 may disable mmW cell measurements and reporting. Disabling mmW measurement and reporting (e.g., all mmW measurement and reporting, fewer than all mmW measurement and reporting, etc.) may reduce the mmW RF transmissions made by the wireless device 120. In various aspects, while mmW cell measurements and reporting may be disabled, non-mmW cell (e.g., LTE cell, Sub-6 GHz cell, etc.) measurements and reporting may continue. In this manner, while mmW RF measurements and reporting may be disabled non-mmW cell (e.g., LTE cell, Sub-6 GHz cell, etc.) measurements and reporting may be reported in a usual manner based on cell measurements of non-mmW cells (e.g., LTE cells, Sub-6 GHz cells, etc.).

At 524, the wireless device 120 may receive a RRC configuration from the base station 110. The RRC configuration may have only non-mmW cells (e.g., LTE cells, Sub-6 GHz cells, etc.) configured as the CSI report sent at 520 may have indicated the mmW carrier has a worst possible quality of zero. The base station 110 may have removed mmW cells and added additional non-mmW cells (e.g., LTE cells, Sub-6 GHz cells, etc.) to compensate for any potential loss of throughput that could be experienced by stopping mmW RF transmission. As no mmW cells may be configured, the wireless device 120 may stop mmW RF transmissions in response to the RRC message.

Optionally at 526, the wireless device 120 may determine an RF exposure condition ended. For example, the RF exposure condition for the wireless device 120 may be determined to have ended in response to one or more loud speakers (e.g., 296, 408) of the wireless device 120 being turned on and/or a handsfree type connection (e.g., Bluetooth headset connection, USB headset connection, 3.5 mm headset connection, etc.) being activated.

Optionally at 528, the MO or MT voice call may end. For example, the user, or another party on the call, may end the call.

Optionally at 530, the wireless device 120 may enable mmW cell measurements and reporting. The mmW cell measurements and reporting may be enabled in response to the RF exposure condition ending or the voice call ending.

At 532, the wireless device 120 may set a CQI for the mmW carrier in a CSI report based on CQI measurements for the mmW carrier. At 534, the wireless device 120 may send the CSI report to the base station. At 536, the base station 110 may send an updated RRC configuration to the wireless device 120. The updated RRC configuration may include a modified listing of cells, such as mmW cells and non-mmW cells (e.g., LTE cells, Sub-6 GHz cells, etc.), with cells in the list added or removed based on the CSI report from the wireless device 120. In this manner, based on the CQI measurements by the wireless device 120, the base station 110 may modify the cells available to the wireless device 120.

Figure 6:
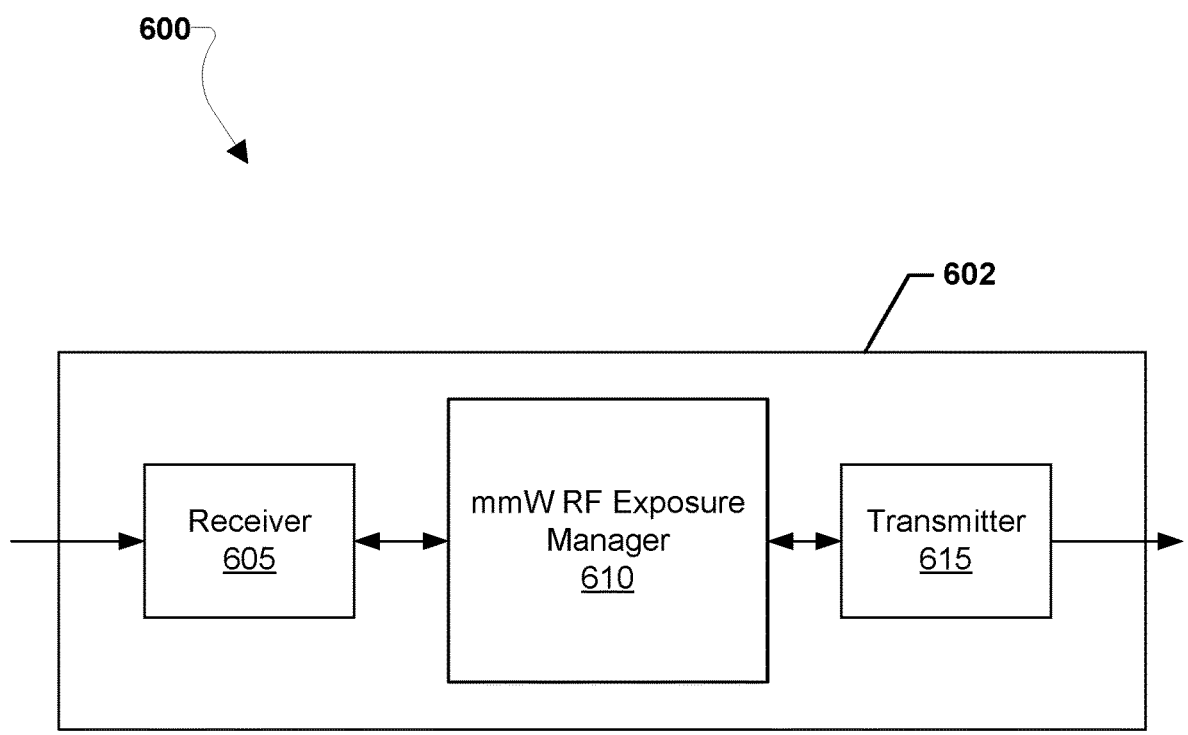
FIGS. 6 through 8 show block diagrams of a device that supports reducing (or avoid) excessive mmW RF exposure to a user of a wireless device in accordance with aspects of the present disclosure.

FIG. 6 shows a block diagram 600 of a device 602 that supports reducing (or avoiding) excessive mmW RF exposure to a user of a wireless device according to various aspects. With reference to FIGS. 1-6, device 602 may be an example of aspects of a wireless device 120, 200, 402. Device 602 may include receiver 605, mmW RF exposure manager 610, and transmitter 615.

The receiver 605 may receiver information, such as packets, control information, etc., associated with RF communications, such as mmW RF communications, non-mmW RF communications, etc. The receiver 605 may be an example aspect of transceiver 256, 266 and/or mmW receiver 430. The transmitter 615 may send information, such as packets, control information, etc., associated with RF communications, such as mmW RF communications, non-mmW RF communications, etc. The transmitter 615 may be an example aspect of transceiver 256, 266 and/or mmW transmitter 450.

The mmW RF exposure manager 610 may be an example of aspects of the mmW RF exposure manager 101, 401. The mmW RF exposure manager 610 may determine an RF exposure condition for the wireless device is occurring while the wireless device is operating in a mmW mode during a voice call and adjusting a mmW carrier quality report to deprioritize usage of mmW in response to determining that the RF exposure condition for the wireless device is occurring during the voice call. The mmW RF exposure manager 610 may set a CQI for a mmW carrier to zero in a CSI report in response to determining that the RF exposure condition for the wireless device is occurring during the voice call. The mmW RF exposure manager 610 may disable mmW cell measurements and reporting in response to determining that the RF exposure condition for the wireless device is occurring during the voice call. The mmW RF exposure manager 610 may determine the RF exposure condition for the wireless device ended during the voice call and adjust a mmW carrier quality report to reprioritize usage of mmW in response to determining that the RF exposure condition for the wireless device ended during the voice call. The mmW RF exposure manager 610 may set the CQI for the mmW carrier based on CQI measurements for the mmW carrier in a CSI report in response to determining that the RF exposure condition for the wireless device ended during the voice call.

The mmW RF exposure manager 610 may determine an antenna array located away from a location of an ear speaker for the wireless device is available for mmW RF beaming in response to determining that the RF exposure condition for the wireless device is occurring during the voice call, prevent all antenna arrays other than the antenna array located away from the location of the ear speaker for the wireless device from emitting mmW beams in response to determining that the antenna array located away from the location of the ear speaker for the wireless device is available for mmW RF beaming, prevent the antenna array located away from the location of the ear speaker for the wireless device from emitting mmW beams having a beam width narrower than a threshold in response to determining that the antenna array located away from the location of the ear speaker for the wireless device is available for mmW RF beaming, and adjust a mmW carrier quality report to deprioritize usage of mmW in response to determining that the antenna array located away from the location of the ear speaker for the wireless device is not available for mmW RF beaming. The mmW RF exposure manager 610 may modify a codebook of the wireless device in response to determining that the antenna array located away from the location of the ear speaker for the wireless device is available for mmW RF beaming. The mmW RF exposure manager 610 may remove L2 and narrower beams from the codebook in response to determining that the antenna array located away from the location of the ear speaker for the wireless device is available for mmW RF beaming. The mmW RF exposure manager 610 may modify a codebook of the wireless device to remove beams (e.g., all beams or fewer than all beams) from the codebook using all antenna arrays other than the antenna array located away from the location of the ear speaker for the wireless device in response to determining that the antenna array located away from the location of the ear speaker for the wireless device is available for mmW RF beaming.

The mmW RF exposure manager 610 may determine a first beam in use for mmW RF beaming is radiating in a direction associated with the user's head in response to determining that the RF exposure condition for the wireless device is occurring during the voice call, determine an antenna array located away from a location of an ear speaker for the wireless device is available for mmW RF beaming in response to determining that the first beam in use for mmW RF beaming is radiating in the direction associated with the user's head, determine a second beam for mmW RF beaming emitted by the antenna array located away from the location of the ear speaker for the wireless device is a suitable substitute for the first beam in response to determining that the antenna array located away from the location of the ear speaker for the wireless device is available for mmW RF beaming, the second beam for mmW RF beaming emitted by the antenna array located away from the location of the ear speaker for the wireless device is emitted in a direction different from the first beam, and switch to the second beam for mmW RF beaming emitted by the antenna array located away from the location of the ear speaker for the wireless device for mmW operations in response to determining that the second beam for mmW RF beaming emitted by the antenna array located away from the location of the ear speaker for the wireless device is a suitable substituted for the first beam. The mmW RF exposure manager 610 may adjust a mmW carrier quality report to deprioritize usage of mmW in response to determining that the first beam in use for mmW RF beaming is not radiating in the direction associated with the user's head, that the antenna array located away from the location of the ear speaker for the wireless device is not available for mmW RF beaming, or that the second beam for mmW RF beaming emitted by the antenna array located away from the location of the ear speaker for the wireless device is not a suitable substituted for the first beam.

The mmW RF exposure manager 610 may output an indication to the user to initiate a mmW reprioritization action in response to determining that the RF exposure condition for the wireless device is occurring during the voice call, determine the mmW reprioritization action occurs within a time threshold after outputting the indication to the user to initiate the mmW reprioritization action, and adjust a mmW carrier quality report to deprioritize usage of mmW in response to determining that a mmW prioritization action does not occur within the time threshold. The mmW RF exposure manager 610 may determine a user indication of accepting mmW de-prioritization is received in response to outputting the indication to the user to initiate the mmW prioritization action, and adjust a mmW carrier quality report to deprioritize usage of mmW in response to determining that the user indication of accepting mmW de-prioritization is received.

Figure 7:
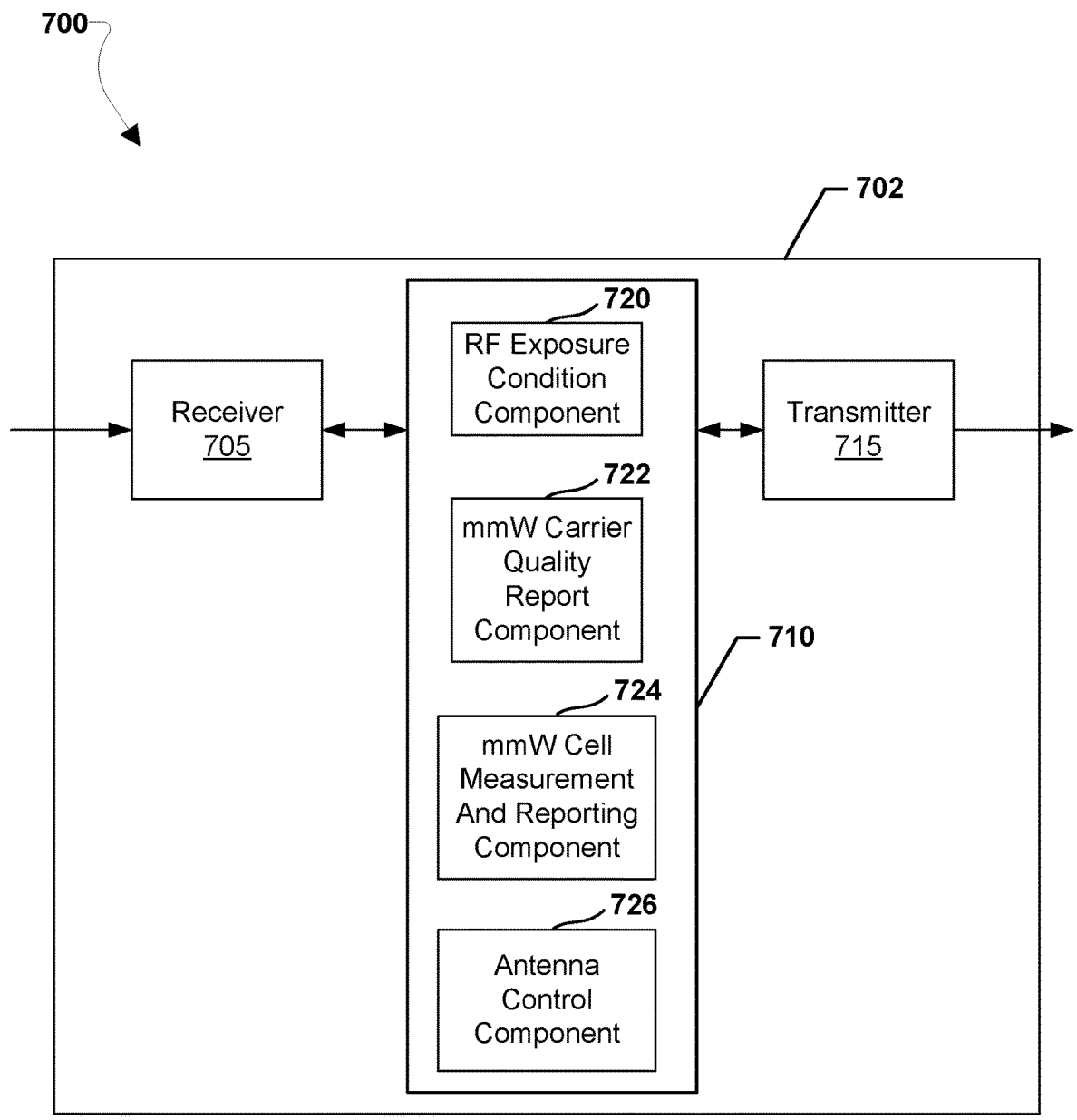

FIG. 7 shows a block diagram 700 of a device 702 that supports reducing (or avoiding) excessive mmW RF exposure to a user of a wireless device in accordance with aspects of the present disclosure. With reference to FIGS. 1-7, device 702 may be an example of aspects of a wireless device 120, 200, 402 and/or device 602. Device 702 may include receiver 705, mmW RF exposure manager 710, and transmitter 715. Device 702 may also include a processor. Each of the components of device 702 may be in communication with one another (e.g., via one or more buses or other type connections).

The receiver 705 may receiver information, such as packets, control information, etc., associated with RF communications, such as mmW RF communications, non-mmW RF communications, etc. The receiver 705 may be an example aspect of transceiver 256, 266, mmW receiver 430, and/or receiver 605. The transmitter 715 may send information, such as packets, control information, etc., associated with RF communications, such as mmW RF communications, non-mmW RF communications, etc. The transmitter 715 may be an example aspect of transceiver 256, 266, mmW transmitter 450, and/or transmitter 615.

The mmW RF exposure manager 710 may be an example of aspects of the mmW RF exposure manager 101, 401, 610. The mmW RF exposure manager 710 may also include an RF exposure condition component 720, a mmW carrier quality report component 722, a mmW cell measurement and reporting component 724, and an antenna control component 726.

The RF exposure condition component 720 may determine an RF exposure condition for the wireless device is occurring while the wireless device is operating in a mmW mode during a voice call, determine the RF exposure condition for the wireless device ended during the voice call, output an indication to the user to initiate a mmW reprioritization action in response to determining that the RF exposure condition for the wireless device is occurring during the voice call, determine the mmW reprioritization action occurs within a time threshold after outputting the indication to the user to initiate the mmW reprioritization action, and determine a user indication of accepting mmW de-prioritization is received in response to outputting the indication to the user to initiate the mmW prioritization action.

The mmW carrier quality report component 722 may adjust a mmW carrier quality report to deprioritize usage of mmW in response to determining that the RF exposure condition for the wireless device is occurring during the voice call, set a CQI for a mmW carrier to zero in a CSI report, adjust a mmW carrier quality report to reprioritize usage of mmW in response to determining that the RF exposure condition for the wireless device ended during the voice call, set the CQI for the mmW carrier based on CQI measurements for the mmW carrier in a CSI report, adjust a mmW carrier quality report to deprioritize usage of mmW in response to determining that the antenna array located away from the location of the ear speaker for the wireless device is not available for mmW RF beaming, adjust a mmW carrier quality report to deprioritize usage of mmW in response to determining that the first beam in use for mmW RF beaming is not radiating in the direction associated with the user's head, adjust a mmW carrier quality report to deprioritize usage of mmW in response to determining that the antenna array located away from the location of the ear speaker for the wireless device is not available for mmW RF beaming, adjust a mmW carrier quality report to deprioritize usage of mmW in response to determining that the second beam for mmW RF beaming emitted by the antenna array located away from the location of the ear speaker for the wireless device is not a suitable substituted for the first beam, adjust a mmW carrier quality report to deprioritize usage of mmW in response to determining that a mmW prioritization action does not occur within the time threshold, and adjust a mmW carrier quality report to deprioritize usage of mmW in response to determining that the user indication of accepting mmW de-prioritization is received.

The mmW cell measurement and reporting component 724 may disable mmW cell measurements and reporting in response to determining that the RF exposure condition for the wireless device is occurring during the voice call.

The antenna control component 726 may determine an antenna array located away from a location of an ear speaker for the wireless device is available for mmW RF beaming in response to determining that the RF exposure condition for the wireless device is occurring during the voice call, prevent all antenna arrays other than the antenna array located away from the location of the ear speaker for the wireless device from emitting mmW beams in response to determining that the antenna array located away from the location of the ear speaker for the wireless device is available for mmW RF beaming, prevent the antenna array located away from the location of the ear speaker for the wireless device from emitting mmW beams having a beam width narrower than a threshold in response to determining that the antenna array located away from the location of the ear speaker for the wireless device is available for mmW RF beaming, modify a codebook of the wireless device, remove L2 and narrower beams from the codebook, modify a codebook of the wireless device to remove beams (e.g., all beams or fewer than all beams) from the codebook using all antenna arrays other than the antenna array located away from the location of the ear speaker for the wireless device, determine a first beam in use for mmW RF beaming is radiating in a direction associated with the user's head in response to determining that the RF exposure condition for the wireless device is occurring during the voice call, determine an antenna array located away from a location of an ear speaker for the wireless device is available for mmW RF beaming in response to determining that the first beam in use for mmW RF beaming is radiating in the direction associated with the user's head, determine a second beam for mmW RF beaming emitted by the antenna array located away from the location of the ear speaker for the wireless device is a suitable substitute for the first beam in response to determining that the antenna array located away from the location of the ear speaker for the wireless device is available for mmW RF beaming, the second beam for mmW RF beaming emitted by the antenna array located away from the location of the ear speaker for the wireless device is emitted in a direction different from the first beam, and switch to the second beam for mmW RF beaming emitted by the antenna array located away from the location of the ear speaker for the wireless device for mmW operations in response to determining that the second beam for mmW RF beaming emitted by the antenna array located away from the location of the ear speaker for the wireless device is a suitable substituted for the first beam.

Figure 8:
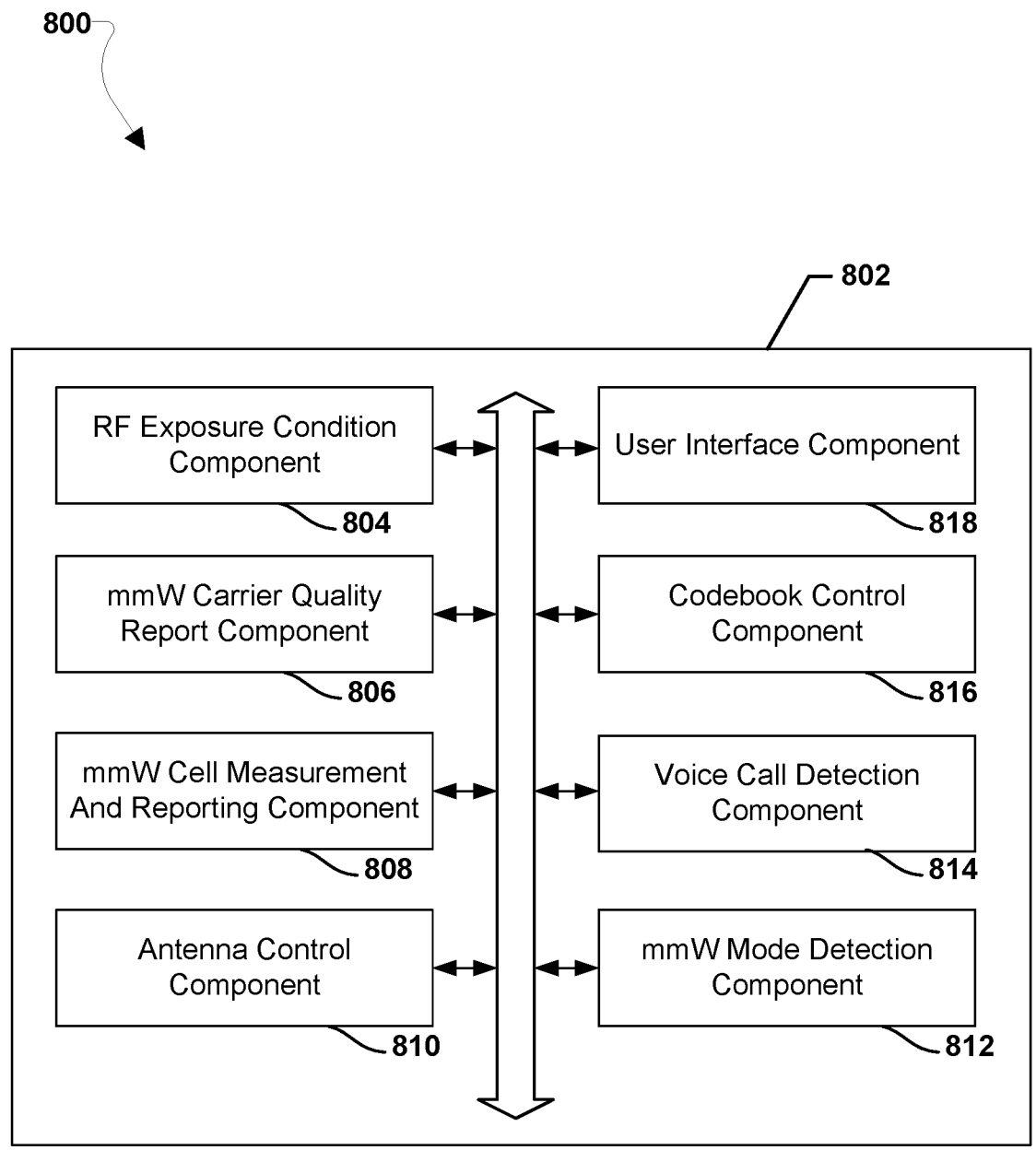

FIG. 8 shows a block diagram 800 of a mmW RF exposure manager 802 that supports reducing (or avoiding) excessive mmW RF exposure to a user of a wireless device in accordance with aspects of the present disclosure. With reference to FIGS. 1-8, the mmW RF exposure manager 802 may be an example of aspects of the mmW RF exposure manager 101, 401, 610, 710. The mmW RF exposure manager 802 may include an RF exposure condition component 804, a mmW carrier quality report component 806, a mmW cell measurement and reporting component 808, an antenna control component 810, a user interface component 818, a codebook control component 816, a voice call detection component 814, and a mmW mode detection component 812. Each of the components of the mmW RF exposure manager 802 may be in communication with one another (e.g., via one or more buses or other type connections).

The RF exposure condition component 804 may determine an RF exposure condition for the wireless device is occurring while the wireless device is operating in a mmW mode during a voice call, and determine the RF exposure condition for the wireless device ended during the voice call.

The mmW carrier quality report component 806 may adjust a mmW carrier quality report to deprioritize usage of mmW in response to determining that the RF exposure condition for the wireless device is occurring during the voice call, set a CQI for a mmW carrier to zero in a CSI report, adjust a mmW carrier quality report to reprioritize usage of mmW in response to determining that the RF exposure condition for the wireless device ended during the voice call, set the CQI for the mmW carrier based on CQI measurements for the mmW carrier in a CSI report, adjust a mmW carrier quality report to deprioritize usage of mmW in response to determining that the antenna array located away from the location of the ear speaker for the wireless device is not available for mmW RF beaming, adjust a mmW carrier quality report to deprioritize usage of mmW in response to determining that the first beam in use for mmW RF beaming is not radiating in the direction associated with the user's head, adjust a mmW carrier quality report to deprioritize usage of mmW in response to determining that the antenna array located away from the location of the ear speaker for the wireless device is not available for mmW RF beaming, adjust a mmW carrier quality report to deprioritize usage of mmW in response to determining that the second beam for mmW RF beaming emitted by the antenna array located away from the location of the ear speaker for the wireless device is not a suitable substituted for the first beam, adjust a mmW carrier quality report to deprioritize usage of mmW in response to determining that a mmW prioritization action does not occur within the time threshold, and adjust a mmW carrier quality report to deprioritize usage of mmW in response to determining that the user indication of accepting mmW de-prioritization is received The mmW cell measurement and reporting component 808 may disable mmW cell measurements and reporting in response to determining that the RF exposure condition for the wireless device is occurring during the voice call.

The antenna control component 810 may determine an antenna array located away from a location of an ear speaker for the wireless device is available for mmW RF beaming in response to determining that the RF exposure condition for the wireless device is occurring during the voice call, prevent all antenna arrays other than the antenna array located away from the location of the ear speaker for the wireless device from emitting mmW beams in response to determining that the antenna array located away from the location of the ear speaker for the wireless device is available for mmW RF beaming, prevent the antenna array located away from the location of the ear speaker for the wireless device from emitting mmW beams having a beam width narrower than a threshold in response to determining that the antenna array located away from the location of the ear speaker for the wireless device is available for mmW RF beaming, determine a first beam in use for mmW RF beaming is radiating in a direction associated with the user's head in response to determining that the RF exposure condition for the wireless device is occurring during the voice call, determine an antenna array located away from a location of an ear speaker for the wireless device is available for mmW RF beaming in response to determining that the first beam in use for mmW RF beaming is radiating in the direction associated with the user's head, determine a second beam for mmW RF beaming emitted by the antenna array located away from the location of the ear speaker for the wireless device is a suitable substitute for the first beam in response to determining that the antenna array located away from the location of the ear speaker for the wireless device is available for mmW RF beaming, the second beam for mmW RF beaming emitted by the antenna array located away from the location of the ear speaker for the wireless device is emitted in a direction different from the first beam, and switch to the second beam for mmW RF beaming emitted by the antenna array located away from the location of the ear speaker for the wireless device for mmW operations in response to determining that the second beam for mmW RF beaming emitted by the antenna array located away from the location of the ear speaker for the wireless device is a suitable substituted for the first beam The user interface component 818 may output an indication to the user to initiate a mmW reprioritization action in response to determining that the RF exposure condition for the wireless device is occurring during the voice call, determine the mmW reprioritization action occurs within a time threshold after outputting the indication to the user to initiate the mmW reprioritization action, and determine a user indication of accepting mmW de-prioritization is received in response to outputting the indication to the user to initiate the mmW prioritization action.

The codebook control component 816 may modify a codebook of the wireless device, remove L2 and narrower beams from the codebook, and modify a codebook of the wireless device to remove beams (e.g., all beams or fewer than all beams) from the codebook using all antenna arrays other than the antenna array located away from the location of the ear speaker for the wireless device.

The voice call detection component 814 may determine whether a voice call is occurring.

The mmW mode detection component 812 may determine whether the wireless device is operating in a mmW mode.

Figure 9:
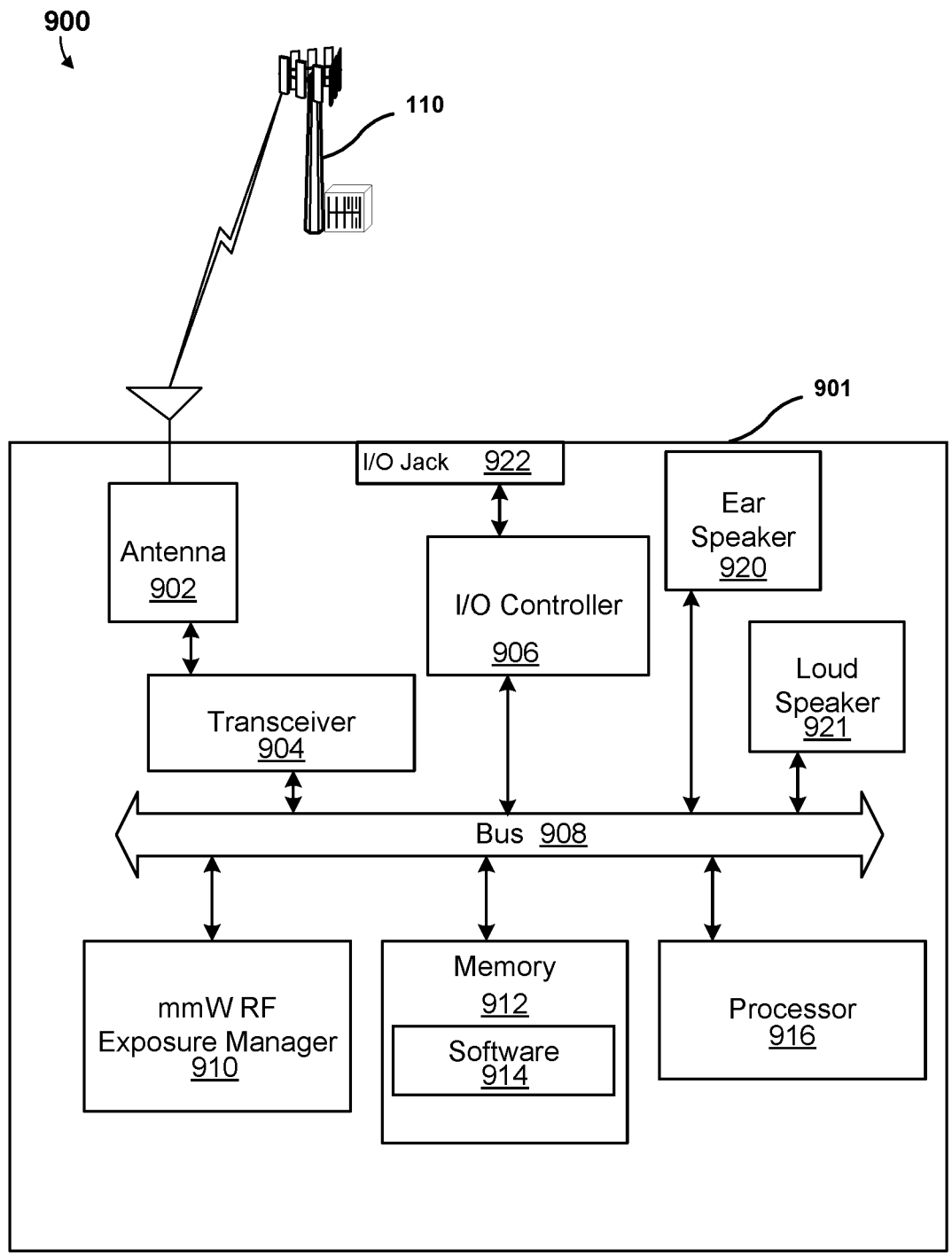
FIG. 9 illustrates a block diagram of a system including a wireless device that supports reducing (or avoiding) mmW RF exposure to a user of the wireless device in accordance with aspects of the present disclosure.

FIG. 9 shows a system 900 including a wireless device 901 that supports reducing (or avoiding) excessive mmW RF exposure to a user of the wireless device in accordance with aspects of the present disclosure. With reference to FIGS. 1-9, the wireless device 901 may be an example of, and/or include the components of, wireless device 120, 200, 402 and/or device 602, 702. Wireless device 901 may include components for voice and data communications including components for transmitting and receiving communications, including mmW RF exposure manager 910, transceiver 904, antenna 902, input/output controller 906, bus 908, memory 912, software 914, processor 916, loud speaker 921, ear speaker 920, and I/O jack 922. The mmW RF exposure manager 910 may be an example of aspects of the mmW RF exposure manager 101, 401, 610, 710, 802. The components of the wireless device 901 may be in electronic communication with one another via one or more buses, such as bus 908. Wireless device 901 may communicate wirelessly with one or more base station 110.

The processor 916 may include a hardware device, (e.g., a general-purpose processor, a DSP, a CPU, etc.). The processor 916 may be configured to operate a memory array using a memory controller and/or a memory controller may be integrated into processor 916. Processor 916 may be configured to execute processor-executable instructions stored in a memory to perform various functions (e.g., functions or tasks supporting reducing (or avoiding) excessive mmW RF exposure to a user of a wireless device).

The memory 912 may include random access memory (RAM) and read-only memory (ROM). The memory 912 may store processor readable, processor-executable software 914 including instructions that, when executed, cause the processor 916 to perform various functions described herein. In some cases, the memory 914 may include a Basic Input/Output System (BIOS) which may control basic hardware and/or software operation such as the interaction with peripheral components or devices. Software 914 may include code to implement aspects of the present disclosure, including code to support reducing (or avoiding) excessive mmW RF exposure to a user of a wireless device. Software 914 may be stored in a non-transitory processor readable medium such as system memory or other memory. In some scenarios, the software 914 may not be directly executable by the processor 916, but may cause a computer (e.g., when compiled and executed) to perform functions described herein.

The transceiver 904 may communicate bi-directionally, via one or more antennas 902 using wireless links as described above or via wired links. For example, the transceiver 904 may represent a wireless transceiver and may communicate bi-directionally with another wireless transceiver. The transceiver 904 may also include a modem to modulate the packets and provide the modulated packets to the antennas 902 for transmission, and to demodulate packets received from the antennas 902. The transceiver 904 may be an example of aspects of transceiver 256, 266, mmW receiver 430, receiver 605, mmW transmitter 450, and/or transmitter 615.

The wireless device 901 may include one or more antennas 902. The antennas 902 may be an example of aspects of antennas or antenna arrays 294, 410, 411, 432. I/O controller 906 may manage input and output signals for wireless device 901. I/O controller 906 may also manage peripherals not integrated into wireless device 901, such as headsets, ear pieces, detached speakers, smart home devices, etc. The I/O controller 906 may represent a physical connection or port to an external peripheral and/or may be connected to various connection jacks, such as I/O jack 922 (e.g., I/O jack 297). The I/O controller 906 may utilize an operating system such as iOS®, ANDROID®, MS-DOS®, MS-WINDOWS®, OS/2®, UNIX®, LINUX®, or another operating system. The wireless device 901 may include an ear speaker 920 (e.g., ear speaker 295, 405) and/or a loud speaker 921 (e.g., loud speaker 296, 408).

Figure 10:
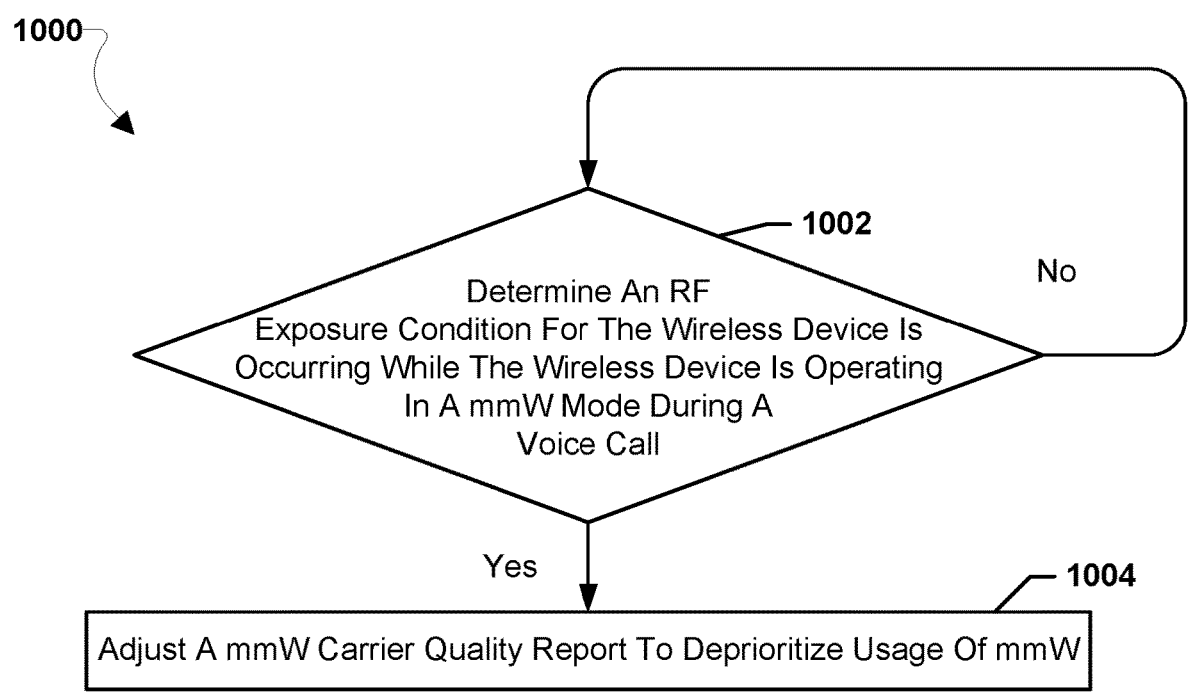
FIGS. 10-16 illustrate methods for reducing (or avoiding) mmW RF exposure to a user of a wireless device in accordance with aspects of the present disclosure.

FIG. 10 is a process flow diagram illustrating a method 1000 for reducing (or avoiding) excessive mmW RF exposure to a user of a wireless device in accordance with various aspects. With reference to FIGS. 1-10, as examples, the operations of the method 1000 may be performed by a processor (such as the processor 210, 212, 214, 216, 218, 252, 260, 409, 916) of a wireless device (such as the wireless device 120, 200, 402, 901). As further examples, the operations of the method 1000 may be performed by a mmW RF exposure manager (such as the mmW RF exposure manager 101, 413, 610, 710, 802, 910). In some examples, a device (such as the wireless device 120, 200, 402, 901 or device 602, 702) may execute a set of codes to control the functional elements of the device to perform functions (or operations) of method 1000. Additionally, or alternatively, in some examples, a device (such as the wireless device 120, 200, 402, 901 or device 602, 702) may perform aspects of the functions (or operations) of method 1000 using special-purpose hardware.

In determination block 1002, the wireless device may determine an RF exposure condition for the wireless device is occurring while the wireless device is operating in a mmW mode during a voice call. In some aspects, the RF exposure condition may be a head adjacent usage condition. In other aspects, the RF exposure condition may be a usage condition associated with another sensitive area of a user, such as a user's heart, adjacent to a user's medical device, etc. In some aspects, the RF exposure condition for the wireless device may include one or more loud speakers of the wireless device being turned off and all handsfree type connections (e.g., Bluetooth headset connection, USB headset connection, 3.5 mm headset connection, etc.) being inactive during the voice call. In some aspects, the RF exposure condition for the wireless device may include a user indication that an RF exposure condition is occurring, such as an indication of a user selection of an RF exposure avoidance mode, etc.

In response to determining that the RF exposure condition for the wireless device is not occurring during the voice call (i.e., determination block 1002="No"), the wireless device may continue to determine whether an RF exposure condition for the wireless device is occurring while the wireless device is operating in a mmW mode during a voice call in determination block 1002.

In response to determining that the RF exposure condition for the wireless device is occurring during the voice call (i.e., determination block 1002="Yes"), the wireless device may adjust a mmW carrier quality report to deprioritize usage of mmW in block 1004. As one example, a Channel Quality Indicator (CQI) for a mmW carrier may be set to zero in a Channel State Information (CSI) report to thereby adjust a mmW carrier quality report to deprioritize mmW. In this manner, regardless of the actual CQI determined for the mmW carrier, the CSI report may be adjusted to indicate the mmW carrier has a worst possible quality of zero. As another example, a mmW carrier quality report may be adjusted to include an indication that mmW cells are unreachable to thereby adjust a mmW carrier quality report to deprioritize mmW.

Figure 11:
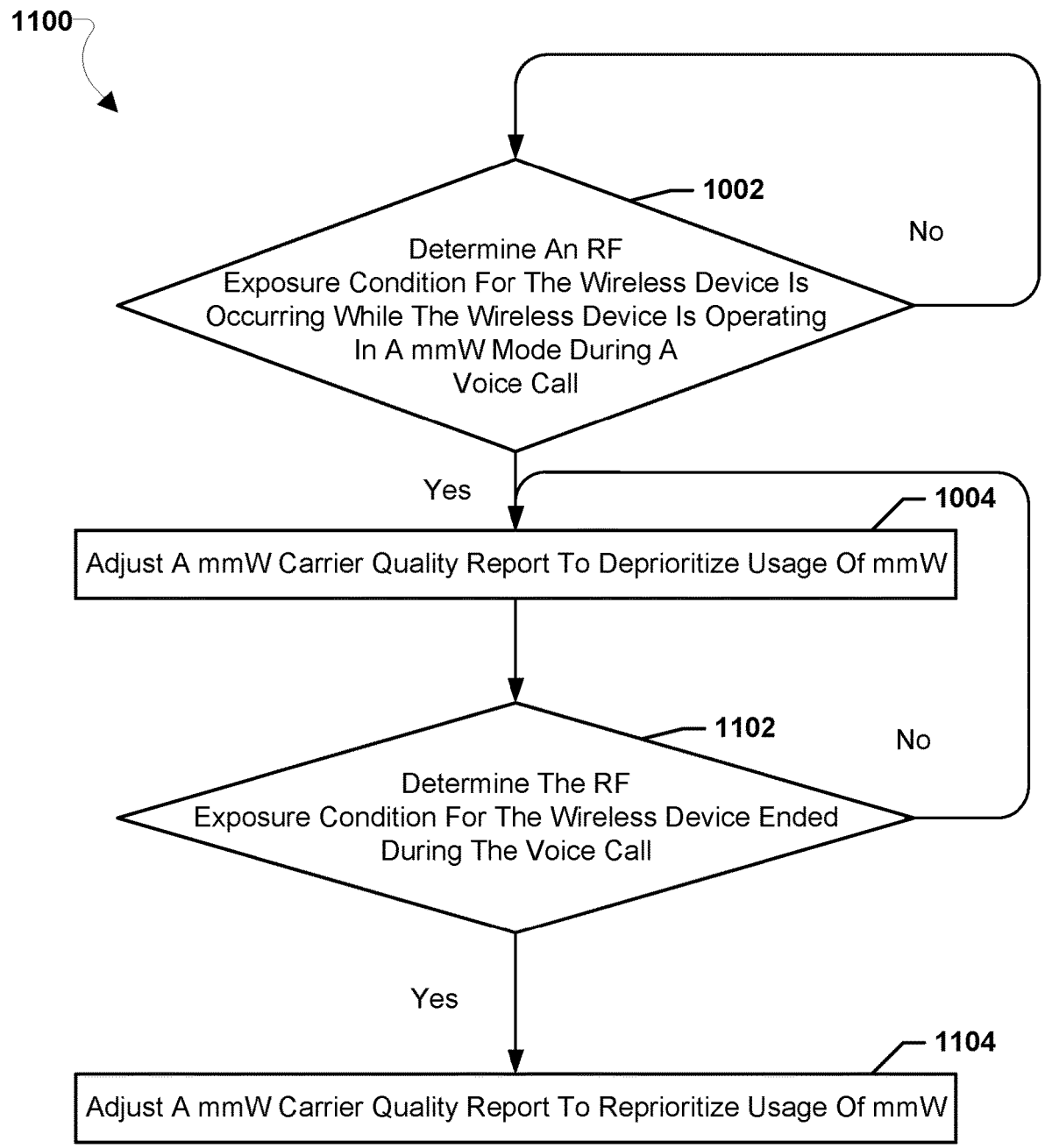

FIG. 11 is a process flow diagram illustrating a method 1100 for reducing (or avoiding) excessive mmW RF exposure to a user of a wireless device in accordance with various aspects. With reference to FIGS. 1-11, as examples, the operations of the method 1100 may be performed by a processor (such as the processor 210, 212, 214, 216, 218, 252, 260, 409, 916) of a wireless device (such as the wireless device 120, 200, 402, 901). As further examples, the operations of the method 1100 may be performed by a mmW RF exposure manager (such as the mmW RF exposure manager 101, 413, 610, 710, 802, 910). In some examples, a device (such as the wireless device 120, 200, 402, 901 or device 602, 702) may execute a set of codes to control the functional elements of the device to perform functions (or operations) of method 1100. Additionally, or alternatively, in some examples, a device (such as the wireless device 120, 200, 402, 901 or device 602, 702) may perform aspects of the functions (or operations) of method 1100 using special-purpose hardware. In various aspects, the operations of method 1100 may be performed in conjunction with the operations of method 1000 (FIG. 10).

In blocks 1002 and 1004 the wireless device may perform operations as described with reference to like numbered blocks of method 1000 (FIG. 10) to determine an RF exposure condition for the wireless device is occurring while the wireless device is operating in a mmW mode during a voice call and adjust a mmW carrier quality report to deprioritize usage of mmW in response to determining that the RF exposure condition for the wireless device is occurring during the voice call.

In determination block 1102, the wireless device may determine the RF exposure condition for the wireless device ended during the voice call. As examples, the RF exposure condition may be determined to have ended in response to a loud speaker of the wireless device being turned on or a handsfree type connection being activated.

In response to determining that the RF exposure condition for the wireless device has not ended during the voice call (i.e., determination block 1102="No"), the wireless device may adjust a mmW carrier quality report to deprioritize usage of mmW in block 1004.

In response to determining that the RF exposure condition for the wireless device ended during the voice call (i.e., determination block 1102="Yes"), the wireless device may adjust a mmW carrier quality report to reprioritize usage of mmW in block 1104. As examples, the CQI for the mmW carrier may be set based on actual CQI measurements for the mmW carrier in a CSI report, a mmW carrier quality report may be adjusted to include an indication that mmW cells are reachable, etc., to reprioritize usage of mmW.

Figure 12:
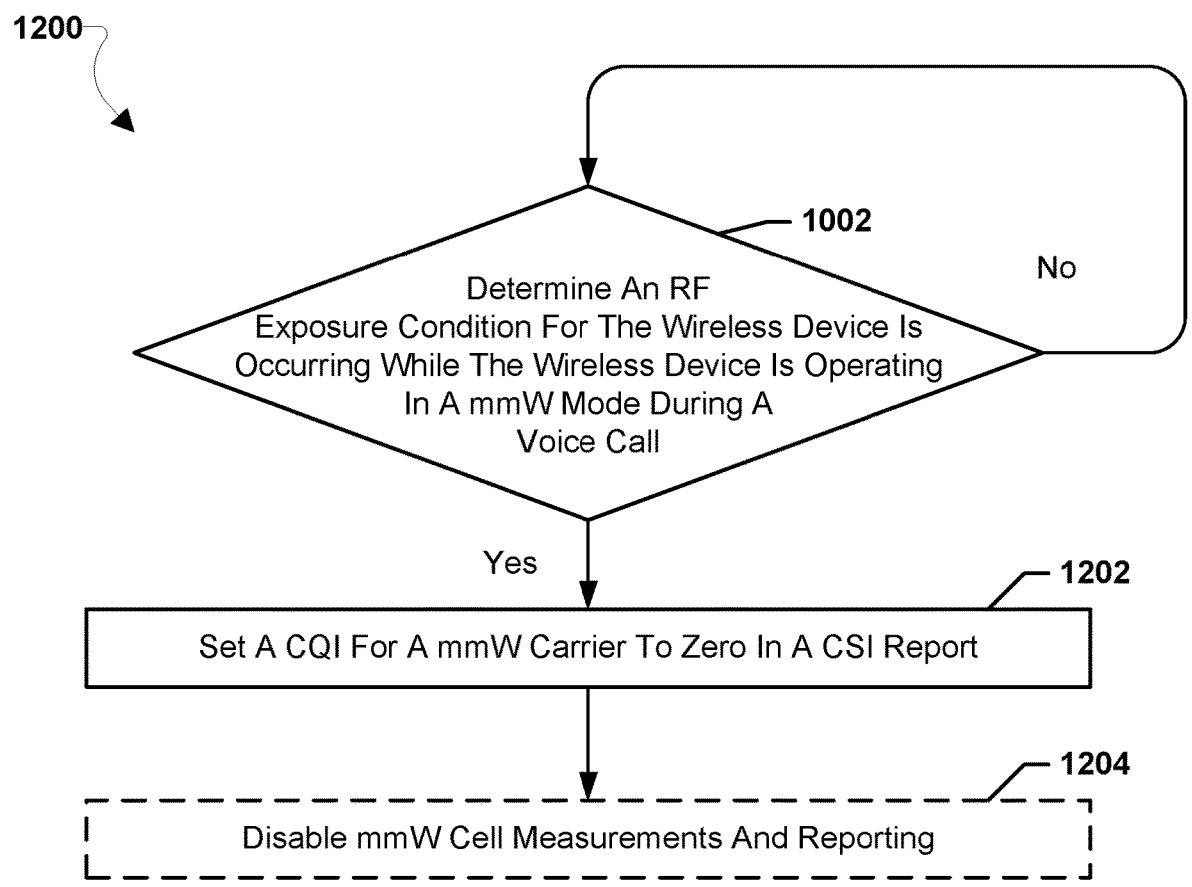

FIG. 12 is a process flow diagram illustrating a method 1200 for reducing (or avoiding) excessive mmW RF exposure to a user of a wireless device in accordance with various aspects. With reference to FIGS. 1-12, as examples, the operations of the method 1200 may be performed by a processor (such as the processor 210, 212, 214, 216, 218, 252, 260, 409, 916) of a wireless device (such as the wireless device 120, 200, 402, 901). As further examples, the operations of the method 1200 may be performed by a mmW RF exposure manager (such as the mmW RF exposure manager 101, 413, 610, 710, 802, 910). In some examples, a device (such as the wireless device 120, 200, 402, 901 or device 602, 702) may execute a set of codes to control the functional elements of the device to perform functions (or operations) of method 1200. Additionally, or alternatively, in some examples, a device (such as the wireless device 120, 200, 402, 901 or device 602, 702) may perform aspects of the functions (or operations) of method 1200 using special-purpose hardware. In various aspects, the operations of method 1200 may be performed in conjunction with the operations of methods 1000 (FIG. 10) and/or 1100 (FIG. 11).

In determination block 1002, the wireless device may perform operations as described with reference to like numbered block of method 1000 (FIG. 10) to determine an RF exposure condition for the wireless device is occurring while the wireless device is operating in a mmW mode during a voice call.

In response to determining that the RF exposure condition for the wireless device is occurring during the voice call (i.e., determination block 1002="Yes"), the wireless device may set a CQI for a mmW carrier to zero in a CSI report in block 1202. In this manner, regardless of the actual CQI determined for the mmW carrier, the CSI report may be adjusted to indicate the mmW carrier has a worst possible CQI.

In optional block 1204, the wireless device may disable mmW cell measurements and reporting. In various aspects, mmW cell measurements and reporting may be disabled in response to determining the RF exposure condition for the wireless device is occurring during the voice call. Muting (e.g., disabling, ceasing, etc.) mmW measurement and reporting (e.g., all mmW measurement and reporting, fewer than all mmW measurement and reporting, etc.) may reduce the mmW RF transmissions made by the wireless device. In various aspects, while mmW cell measurements and reporting may be disabled, non-mmW cell (e.g., LTE cell, Sub-6 GHz cell, etc.) measurements and reporting may continue. In this manner, while mmW RF measurements and reporting may be muted (e.g., disabled, ceased, etc.), non-mmW cell (e.g., LTE cell, Sub-6 GHz cell, etc.) measurements and reporting may be reported in a usual manner based on cell measurements of non-mmW cells (e.g., LTE cells, Sub-6 GHz cells, etc.).

Figure 13:
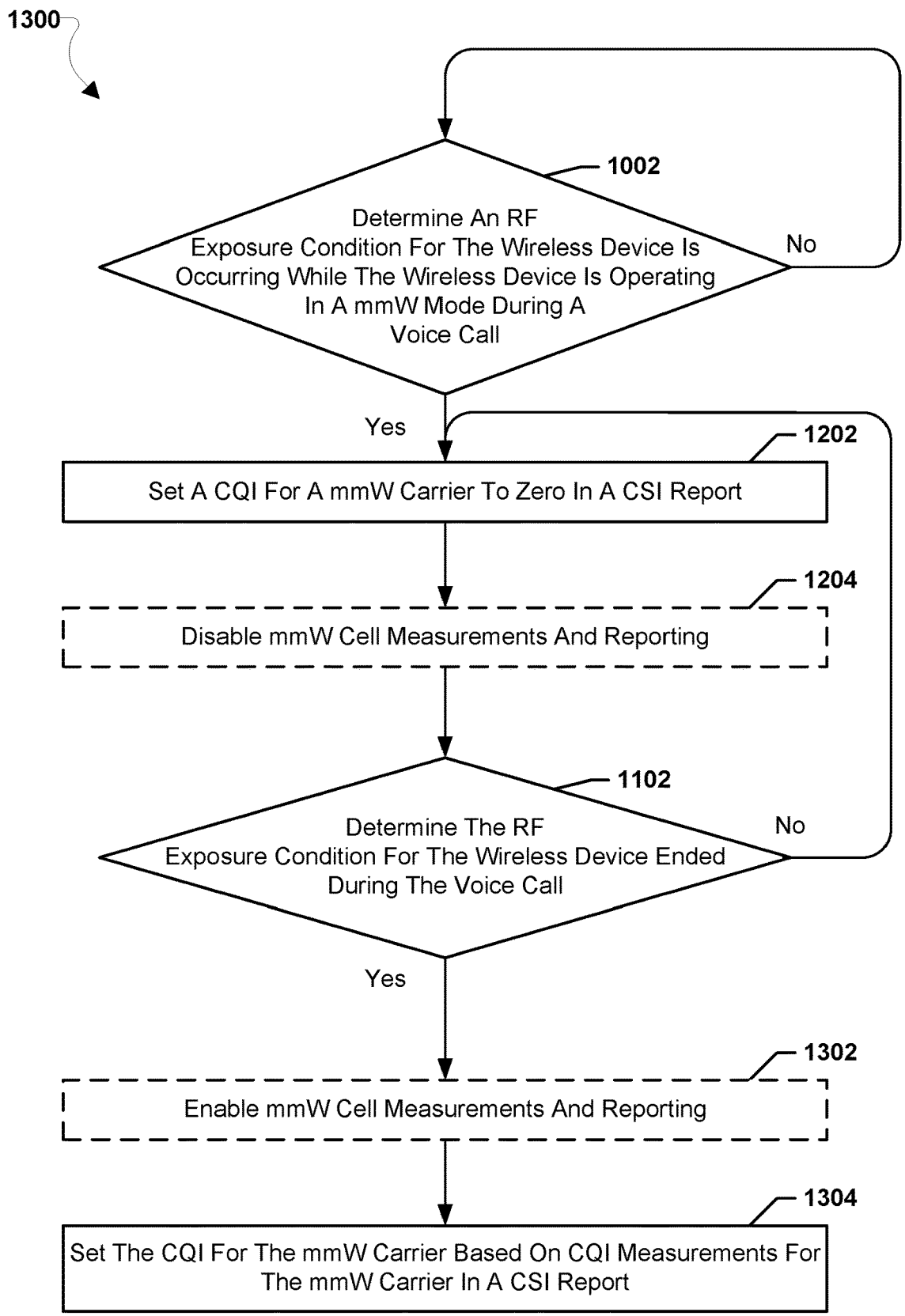

FIG. 13 is a process flow diagram illustrating a method 1300 for reducing (or avoiding) excessive mmW RF exposure to a user of a wireless device in accordance with various aspects. With reference to FIGS. 1-13, as examples, the operations of the method 1300 may be performed by a processor (such as the processor 210, 212, 214, 216, 218, 252, 260, 409, 916) of a wireless device (such as the wireless device 120, 200, 402, 901). As further examples, the operations of the method 1300 may be performed by a mmW RF exposure manager (such as the mmW RF exposure manager 101, 413, 610, 710, 802, 910). In some examples, a device (such as the wireless device 120, 200, 402, 901 or device 602, 702) may execute a set of codes to control the functional elements of the device to perform functions (or operations) of method 1300. Additionally, or alternatively, in some examples, a device (such as the wireless device 120, 200, 402, 901 or device 602, 702) may perform aspects of the functions (or operations) of method 1300 using special-purpose hardware. In various aspects, the operations of method 1300 may be performed in conjunction with the operations of methods 1000 (FIG. 10), 1100 (FIG. 11), and/or 1200 (FIG. 12).

In blocks 1002, 1202, and optionally 1204, the wireless device may perform operations as described with reference to like numbered blocks of method 1200 (FIG. 12) to determine an RF exposure condition for the wireless device is occurring while the wireless device is operating in a mmW mode during a voice call, set a CQI for a mmW carrier to zero in a CSI report in response to determining that the RF exposure condition for the wireless device is occurring during the voice call, and optionally disable mmW cell measurements and reporting.

In determination block 1102, the wireless device may perform operations as described with reference to like numbered block of method 1100 (FIG. 11) to determine the RF exposure condition for the wireless device ended during the voice call.

In response to determining that the RF exposure condition for the wireless device has not ended during the voice call (i.e., determination block 1102="No"), the wireless device may set a CQI for a mmW carrier to zero in a CSI report in block 1202.

In response to determining that the RF exposure condition for the wireless device ended during the voice call (i.e., determination block 1102="Yes"), the wireless device may, optionally, enable mmW cell measurements and reporting in optional block 1302. For example, the wireless device may resume measurement and reporting operations related to mmW cells.

In block 1304, the wireless device may set the CQI for the mmW carrier based on CQI measurements for the mmW carrier in a CSI report. As an example, the CQI for the mmW carrier may be set based on actual CQI measurements for the mmW carrier in a CSI report.

Figure 14:
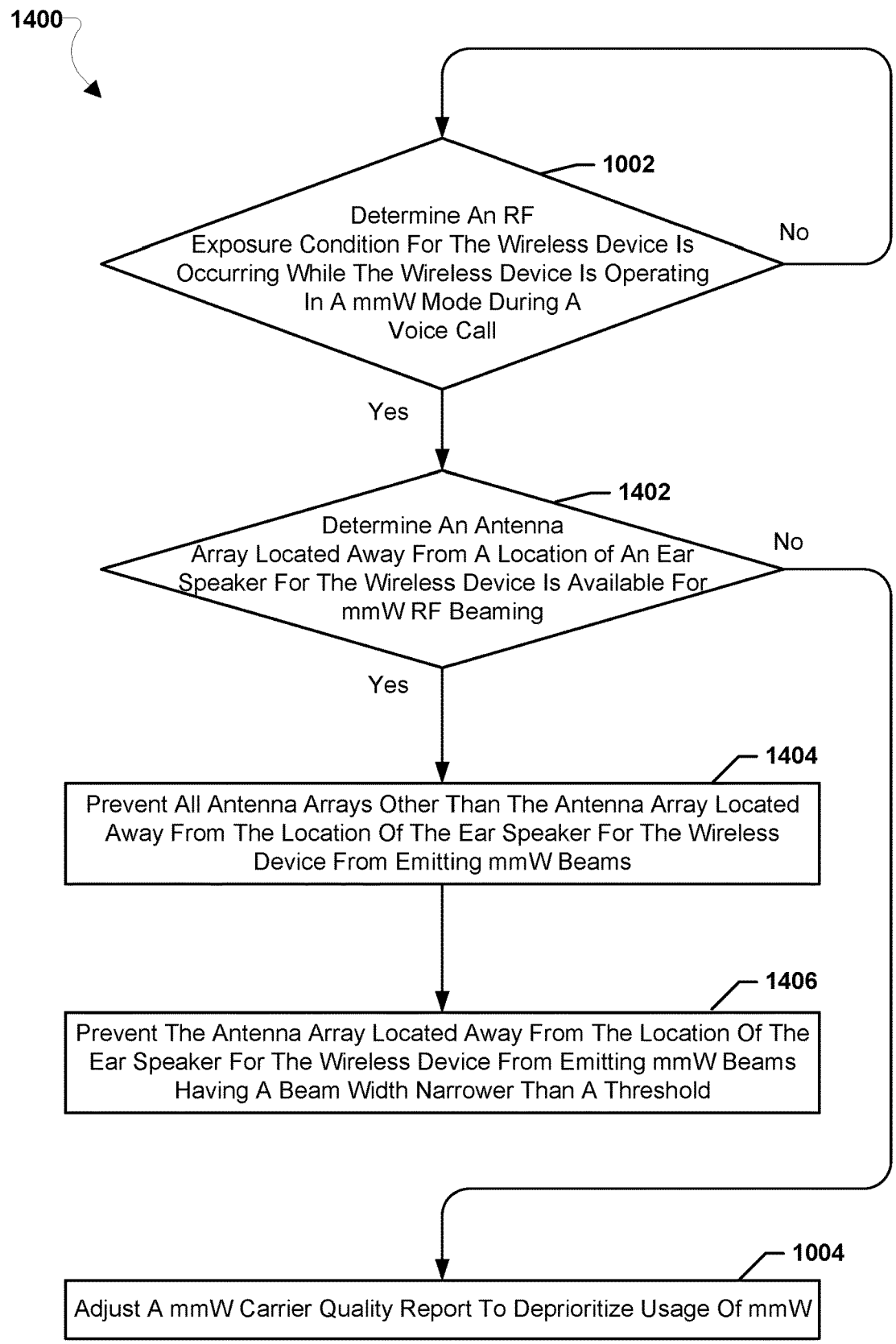

FIG. 14 is a process flow diagram illustrating a method 1400 for reducing (or avoiding) excessive mmW RF exposure to a user of a wireless device in accordance with various aspects. With reference to FIGS. 1-14, as examples, the operations of the method 1400 may be performed by a processor (such as the processor 210, 212, 214, 216, 218, 252, 260, 409, 916) of a wireless device (such as the wireless device 120, 200, 402, 901). As further examples, the operations of the method 1400 may be performed by a mmW RF exposure manager (such as the mmW RF exposure manager 101, 413, 610, 710, 802, 910). In some examples, a device (such as the wireless device 120, 200, 402, 901 or device 602, 702) may execute a set of codes to control the functional elements of the device to perform functions (or operations) of method 1400. Additionally, or alternatively, in some examples, a device (such as the wireless device 120, 200, 402, 901 or device 602, 702) may perform aspects of the functions (or operations) of method 1400 using special-purpose hardware. In various aspects, the operations of method 1400 may be performed in conjunction with the operations of methods 1000 (FIG. 10), 1100 (FIG. 11), 1200 (FIG. 12), and/or 1300 (FIG. 13).

In determination block 1002, the wireless device may perform operations as described with reference to like numbered block of method 1000 (FIG. 10) to determine an RF exposure condition for the wireless device is occurring while the wireless device is operating in a mmW mode during a voice call.

In response to determining that the RF exposure condition for the wireless device is occurring during the voice call (i.e., determination block 1002="Yes"), the wireless device may determine an antenna array located away from a location of an ear speaker for the wireless device is available for mmW RF beaming in determination block 1402. As example, the availability of an antenna array located away from a location of an ear speaker for the wireless device is available for mmW RF beaming may be based on configuration settings of the wireless device, status checks of antennas of the wireless device, user settings, operating modes of the wireless device, and/or any other criteria that may indicate whether or not an antenna array is available for mmW RF beaming.

In response to determining that the antenna array located away from the location of the ear speaker for the wireless device is available for mmW RF beaming (i.e., determination block 1402="Yes"), the wireless device may prevent all antenna arrays other than the antenna array located away from the location of the ear speaker for the wireless device from emitting mmW beams in block 1404. In some aspects, preventing all antenna arrays other than the antenna array located away from the location of the ear speaker for the wireless device from emitting mmW beams may include modifying a codebook of the wireless device to remove beams (e.g., all beams or fewer than all beams) from the codebook using all antenna arrays other than the antenna array located away from the location of the ear speaker for the wireless device.

In block 1406, the wireless device may prevent the antenna array located away from the location of the ear speaker for the wireless device from emitting mmW beams having a beam width narrower than a threshold. In some aspects, preventing the antenna array located away from the location of the ear speaker for the wireless device from emitting mmW beams having a beam width narrower than a threshold may include modifying a codebook of the wireless device. In some aspects, modifying the codebook of the wireless device may include removing L2 and narrower beams from the codebook.

In response to determining that the antenna array located away from the location of the ear speaker for the wireless device is not available for mmW RF beaming (i.e., determination block 1402="No"), the wireless device may adjust a mmW carrier quality report to deprioritize usage of mmW in block 1004 by performing operations as described with reference to like numbered block of method 1000 (FIG. 10).

Figure 15:
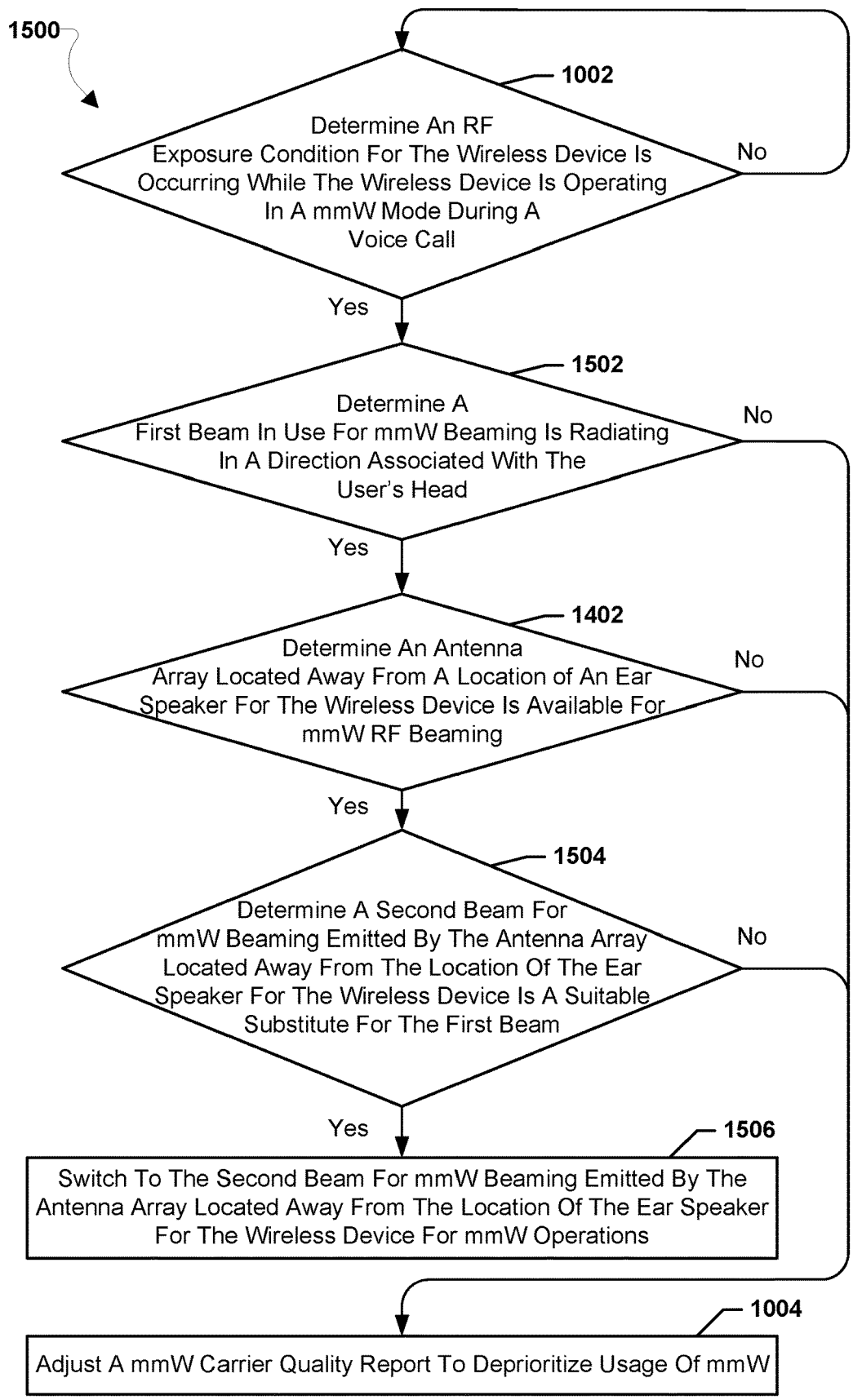

FIG. 15 is a process flow diagram illustrating a method 1500 for reducing (or avoiding) excessive mmW RF exposure to a user of a wireless device in accordance with various aspects. With reference to FIGS. 1-15, as examples, the operations of the method 1500 may be performed by a processor (such as the processor 210, 212, 214, 216, 218, 252, 260, 409, 916) of a wireless device (such as the wireless device 120, 200, 402, 901). As further examples, the operations of the method 1500 may be performed by a mmW RF exposure manager (such as the mmW RF exposure manager 101, 413, 610, 710, 802, 910). In some examples, a device (such as the wireless device 120, 200, 402, 901 or device 602, 702) may execute a set of codes to control the functional elements of the device to perform functions (or operations) of method 1500. Additionally, or alternatively, in some examples, a device (such as the wireless device 120, 200, 402, 901 or device 602, 702) may perform aspects of the functions (or operations) of method 1500 using special-purpose hardware. In various aspects, the operations of method 1500 may be performed in conjunction with the operations of methods 1000 (FIG. 10), 1100 (FIG. 11), 1200 (FIG. 12), 1300 (FIG. 13), and/or 1400 (FIG. 14).

In determination block 1002, the wireless device may perform operations as described with reference to like numbered block of method 1000 (FIG. 10) to determine an RF exposure condition for the wireless device is occurring while the wireless device is operating in a mmW mode during a voice call.

In response to determining that the RF exposure condition for the wireless device is occurring during the voice call (i.e., determination block 1002="Yes"), the wireless device may determine a first beam in use for mmW beaming is radiating in a direction associated with the user's head in determination block 1502. As examples, configuration settings, beam mappings, etc., may indicate whether a first beam in use for mmW RF beaming is radiating in a direction associated with the user's head.

In response to determining a first beam in use for mmW beaming is not radiating in a direction associated with the user's head (i.e., determination block 1502="No"), the wireless device may adjust a mmW carrier quality report to deprioritize usage of mmW in block 1004 by performing operations as described with reference to like numbered block of method 1000 (FIG. 10).

In response to determining a first beam in use for mmW beaming is radiating in a direction associated with the user's head (i.e., determination block 1502="Yes"), the wireless device may determine an antenna array located away from a location of an ear speaker for the wireless device is available for mmW RF beaming in determination block 1402 by performing operations as described with reference to like numbered block of method 1400 (FIG. 14).

In response to determining that the antenna array located away from the location of the ear speaker for the wireless device is not available for mmW RF beaming (i.e., determination block 1402="No"), the wireless device may adjust a mmW carrier quality report to deprioritize usage of mmW in block 1004 by performing operations as described with reference to like numbered block of method 1000 (FIG. 10).

In response to determining that the antenna array located away from the location of the ear speaker for the wireless device is available for mmW RF beaming (i.e., determination block 1402="Yes"), the wireless device may determine a second beam for mmW RF beaming emitted by the antenna array located away from the location of the ear speaker for the wireless device is a suitable substitute for the first beam in determination block 1504. In various aspects, the second beam for mmW RF beaming emitted by the antenna array located away from the location of the ear speaker for the wireless device may be emitted in a direction different from the first beam.

In response to determining that a second beam for mmW RF beaming emitted by the antenna array located away from the location of the ear speaker for the wireless device is not a suitable substitute for the first beam (i.e., determination block 1504="No"), the wireless device may adjust a mmW carrier quality report to deprioritize usage of mmW in block 1004 by performing operations as described with reference to like numbered block of method 1000 (FIG. 10).

In response to determining that a second beam for mmW RF beaming emitted by the antenna array located away from the location of the ear speaker for the wireless device is a suitable substitute for the first beam (i.e., determination block 1504="Yes"), the wireless device may switch to the second beam for mmW RF beaming emitted by the antenna array located away from the location of the ear speaker for the wireless device for mmW operations in block 1506.

Figure 16:
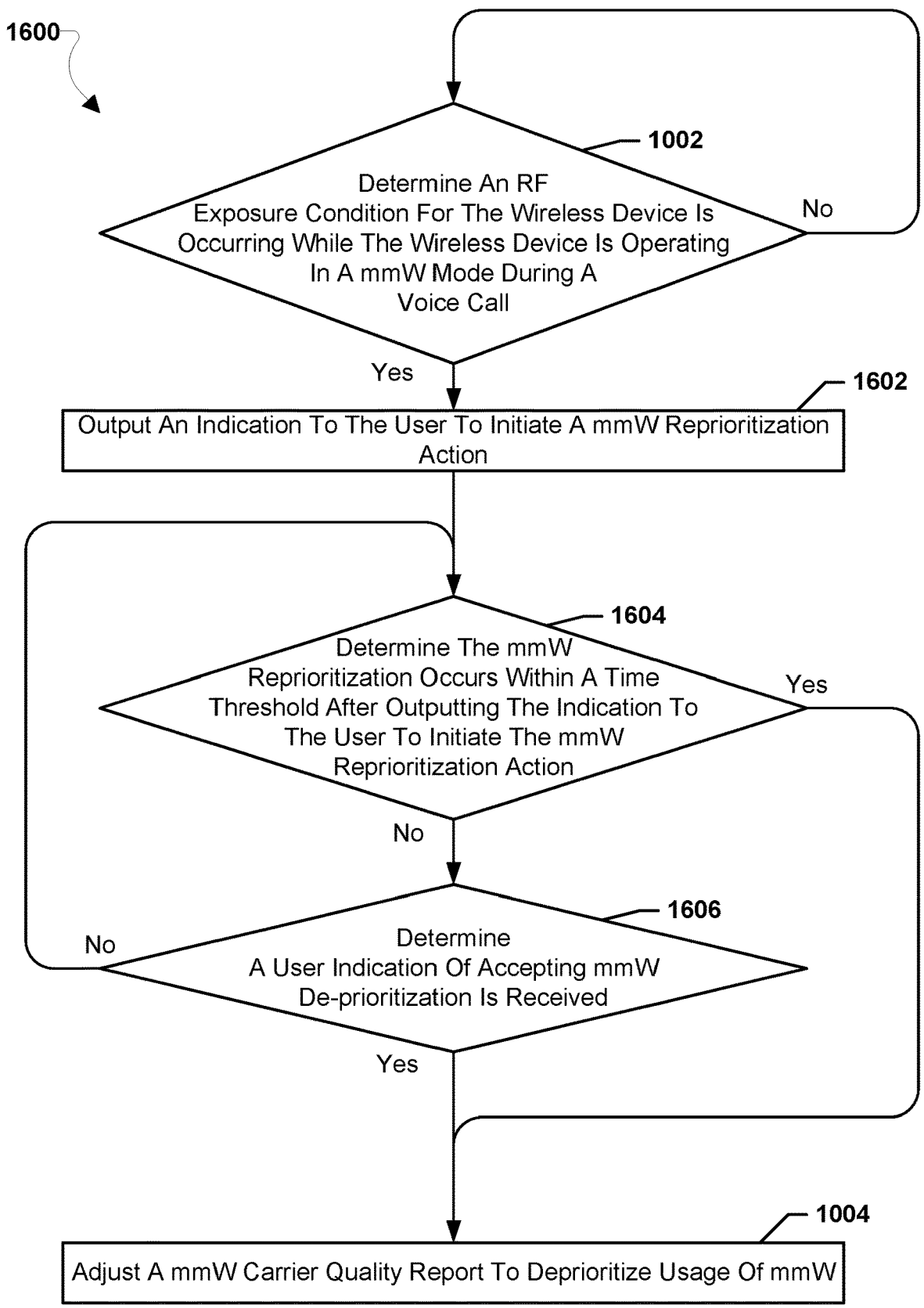

FIG. 16 is a process flow diagram illustrating a method 1600 for reducing (or avoiding) excessive mmW RF exposure to a user of a wireless device in accordance with various aspects. With reference to FIGS. 1-16, as examples, the operations of the method 1600 may be performed by a processor (such as the processor 210, 212, 214, 216, 218, 252, 260, 409, 916) of a wireless device (such as the wireless device 120, 200, 402, 901). As further examples, the operations of the method 1600 may be performed by a mmW RF exposure manager (such as the mmW RF exposure manager 101, 413, 610, 710, 802, 910). In some examples, a device (such as the wireless device 120, 200, 402, 901 or device 602, 702) may execute a set of codes to control the functional elements of the device to perform functions (or operations) of method 1600. Additionally, or alternatively, in some examples, a device (such as the wireless device 120, 200, 402, 901 or device 602, 702) may perform aspects of the functions (or operations) of method 1600 using special-purpose hardware. In various aspects, the operations of method 1600 may be performed in conjunction with the operations of methods 1000 (FIG. 10), 1100 (FIG. 11), 1200 (FIG. 12), 1300 (FIG. 13), 1400 (FIG. 14), and/or 1500 (FIG. 15).

In determination block 1002, the wireless device may perform operations as described with reference to like numbered block of method 1000 (FIG. 10) to determine an RF exposure condition for the wireless device is occurring while the wireless device is operating in a mmW mode during a voice call.

In response to determining that the RF exposure condition for the wireless device is occurring during the voice call (i.e., determination block 1002="Yes"), the wireless device may output an indication to the user to initiate a mmW reprioritization action in block 1602. As examples, outputting an indication to the user to initiate a mmW reprioritization action may include outputting a displayed indication to establish a handsfree connection, outputting a sound associated with handsfree connection availability, outputting a displayed indication to use a loud speaker of the wireless device for the voice call, outputting a displayed indication providing the option to forward the voice call to another wireless device, and/or any other type indication to the user to initiate a mmW reprioritization action. As examples, mmW reprioritization actions may include activating a handsfree connection (e.g., a Bluetooth headset connection, a USB headset connection, a 3.5 mm headset connection, etc.), turning on a loud speaker of the wireless device, and/or forwarding the voice call to another wireless device.

In determination block 1604, the wireless device may determine the mmW reprioritization action occurs within a time threshold after outputting the indication to the user to initiate the mmW reprioritization action. For example, the time threshold may be a period of seconds, such as 1 second, 5 seconds, 10 seconds, more than 10 seconds, etc. In various aspects, a wireless device may track the time since an indication to a user to initiate a mmW reprioritization occurred.

In response to determining to determining that a mmW prioritization action does occur within the time threshold (i.e., determination block 1604="Yes"), the wireless device may adjust a mmW carrier quality report to deprioritize usage of mmW in block 1004 by performing operations as described with reference to like numbered block of method 1000 (FIG. 10).

In response to determining that a mmW prioritization action does not occur within the time threshold (i.e., determination block 1604="No"), the wireless device may determine whether a user indication of accepting mmW de-prioritization is received in determination block 1606. In some aspects, a user may indicate an acceptance of a mmW de-prioritization, such as by a button press, user interface interaction (e.g., swipe, drag, tap, etc.), etc.

In response to determining that a user indication of accepting mmW de-prioritization is not received (i.e., determination block 1606="Yes"), the wireless device may determine the mmW reprioritization action occurs within a time threshold after outputting the indication to the user to initiate the mmW reprioritization action in determination block 1604.

In response to determining that a user indication of accepting mmW de-prioritization is received (i.e., determination block 1606="Yes"), the wireless device may adjust a mmW carrier quality report to deprioritize usage of mmW in block 1004 by performing operations as described with reference to like numbered block of method 1000 (FIG. 10).

Figure 17:
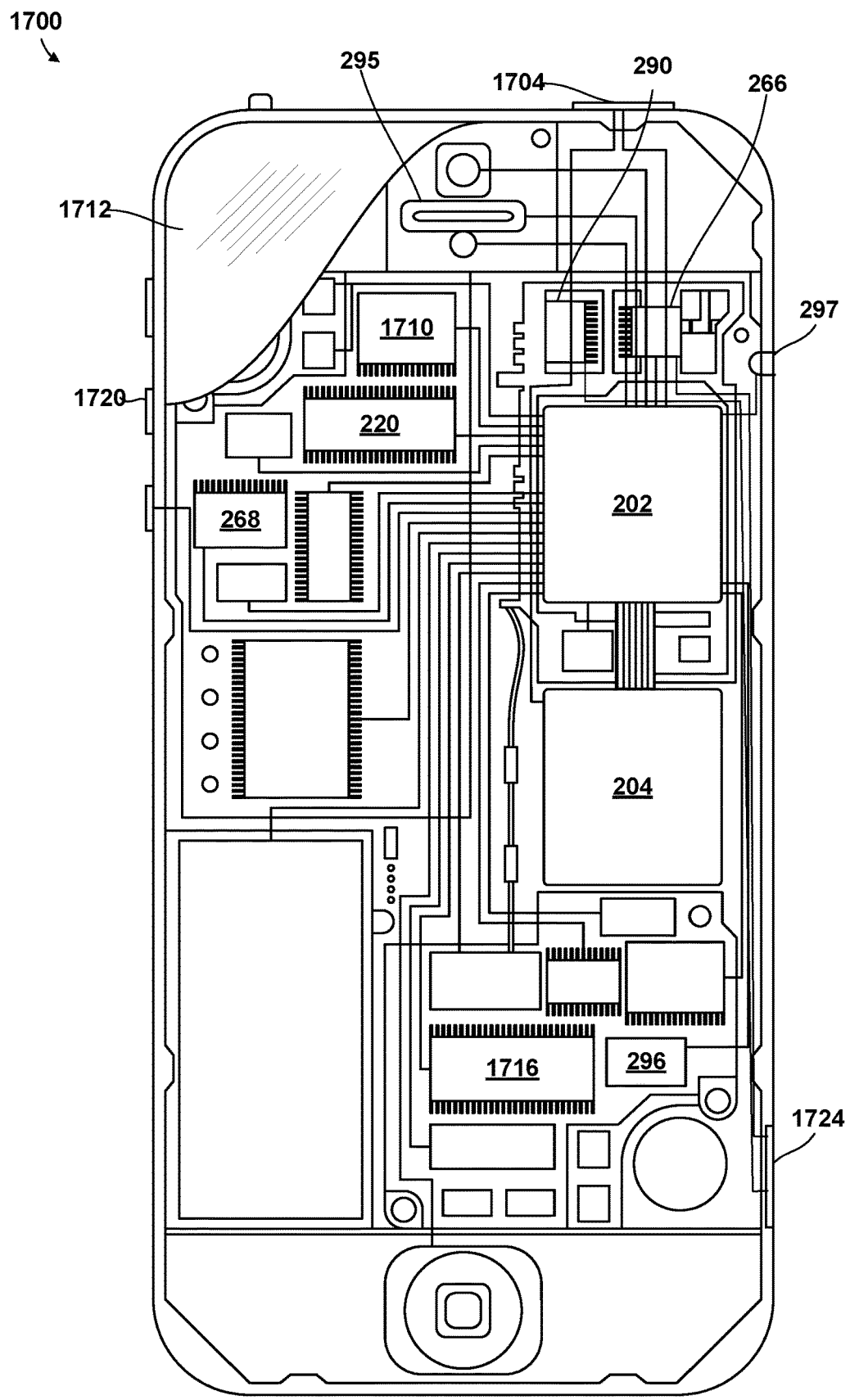
FIG. 17 is a component block diagram of a wireless in accordance with various aspects of the present disclosure.

FIG. 17 is a component block diagram of a wireless device 1700 suitable for use with various aspects. With reference to FIGS. 1-17, various aspects may be implemented on a variety of devices described herein (e.g., the wireless device 120, 200, 402, 901, the devices 602, 702, etc.), an example of which is illustrated in FIG. 10 in the form of a wireless device 1700. The wireless device 1700 may include a first SOC 202 (e.g., a SOC-CPU) coupled to a second SOC 204 (e.g., a 5G capable SOC). The first and second SOCs 202, 204 may be coupled to internal memory 1716, a display 1712, an ear speaker 295 (e.g., ear speaker 405, 920), and to a loud speaker 296 (e.g., loud speaker 408, 921 The first and second SOCs 202, 204 may also be coupled to at least one SIM 268 and/or a SIM interface that may store information supporting a first 5GNR subscription and a second 5GNR subscription, which support service on a 5G non-standalone (NSA) network.

The wireless device 1700 may include multiple antennas 1704, 1724 (e.g., antennas 294, 410, 411, 432, 902) for sending and receiving electromagnetic radiation that may be connected to a wireless transceiver 266 and/or RF front end 290 coupled to one or more processors in the first and/or second SOCs 202, 204. The wireless device 1700 may also include menu selection buttons or rocker switches 1720 for receiving user inputs.

The wireless device 1700 also includes a sound encoding/decoding (CODEC) circuit 1710, which digitizes sound received from a microphone into data packets suitable for wireless transmission and decodes received sound data packets to generate analog signals that are provided to the speakers 295, 296 to generate sound. Also, one or more of the processors in the first and second SOCs 202, 204, wireless transceiver 266, CODEC 1710, and RF front end 290 may include a digital signal processor (DSP) circuit (not shown separately).

The processors of the wireless device 1000 may be any programmable microprocessor, microcomputer or multiple processor chip or chips that can be configured by software instructions (applications) to perform a variety of functions, including the functions of the various aspects described below. In some wireless devices, multiple processors may be provided, such as one processor within an SOC 204 dedicated to wireless communication functions and one processor within an SOC 202 dedicated to running other applications. Software applications may be stored in the memory 220, 258, 912, 1716 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various aspects. Such services and standards include, e.g., third generation partnership project (3GPP), LTE systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general Packet Radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various aspects illustrated and described are provided merely as examples to illustrate various features of the claims. However, features shown and described with respect to any given aspect are not necessarily limited to the associated aspect and may be used or combined with other aspects that are shown and described. Further, the claims are not intended to be limited by any one example aspect. The methods described herein describe possible implementations, and the operations of the methods described herein may be rearranged or otherwise modified. Additionally, other implementations are possible. Further, aspects from two or more of the methods described herein may be combined.

Example 1: A method for reducing excessive millimeter wave (mmW) radio frequency (RF) exposure to a user of a wireless device, comprising: determining an RF exposure condition for the wireless device is occurring while the wireless device is operating in a mmW mode during a voice call; and adjusting a mmW carrier quality report to deprioritize usage of mmW in response to determining that the RF exposure condition for the wireless device is occurring during the voice call.

Example 2: The method of example 1, wherein adjusting the mmW carrier quality report comprises setting a Channel Quality Indicator (CQI) for a mmW carrier to zero in a Channel State Information (CSI) report.

Example 3: The method of any of examples 1 to 2, further comprising: disabling mmW cell measurements and reporting in response to determining that the RF exposure condition for the wireless device is occurring during the voice call.

Example 4: The method of any of examples 1 to 3, wherein the RF exposure condition is a head adjacent usage condition.

Example 5: The method of any of examples 1 to 4, wherein the RF exposure condition for the wireless device comprises one or more loud speakers of the wireless device being turned off and all handsfree type connections being inactive during the voice call.

Example 6: The method of any of examples 1 to 5, further comprising: determining the RF exposure condition for the wireless device ended during the voice call; and adjusting a mmW carrier quality report to reprioritize usage of mmW in response to determining that the RF exposure condition for the wireless device ended during the voice call.

Example 7: The method of any of examples 1 to 6, wherein adjusting the mmW carrier quality report to reprioritize usage of mmW comprises setting the CQI for the mmW carrier based on CQI measurements for the mmW carrier in a CSI report.

Example 8: The method of any of examples 1 to 7, further comprising prior to adjusting the mmW carrier quality report to deprioritize usage of mmW: determining an antenna array located away from a location of an ear speaker for the wireless device is available for mmW RF beaming in response to determining that the RF exposure condition for the wireless device is occurring during the voice call; in response to determining that the antenna array located away from the location of the ear speaker for the wireless device is available for mmW RF beaming: preventing all antenna arrays other than the antenna array located away from the location of the ear speaker for the wireless device from emitting mmW beams; and preventing the antenna array located away from the location of the ear speaker for the wireless device from emitting mmW beams having a beam width narrower than a threshold; and adjusting a mmW carrier quality report to deprioritize usage of mmW in response to determining that the antenna array located away from the location of the ear speaker for the wireless device is not available for mmW RF beaming.

Example 9: The method of any of examples 1 to 8, wherein preventing the antenna array located away from the location of the ear speaker for the wireless device from emitting mmW beams having a beam width narrower than a threshold comprises modifying a codebook of the wireless device.

Example 10: The method of any of examples 1 to 9, wherein modifying the codebook of the wireless device comprises removing L2 and narrower beams from the codebook.

Example 11: The method of any of examples 1 to 10, wherein preventing all antenna arrays other than the antenna array located away from the location of the ear speaker for the wireless device from emitting mmW beams comprises modifying a codebook of the wireless device to remove beams from the codebook using all antenna arrays other than the antenna array located away from the location of the ear speaker for the wireless device.

Example 12: The method of any of examples 1 to 11, further comprising prior to adjusting the mmW carrier quality report to deprioritize usage of mmW: determining a first beam in use for mmW RF beaming is radiating in a direction associated with the user's head in response to determining that the RF exposure condition for the wireless device is occurring during the voice call; determining an antenna array located away from a location of an ear speaker for the wireless device is available for mmW RF beaming in response to determining that the first beam in use for mmW RF beaming is radiating in the direction associated with the user's head; determining a second beam for mmW RF beaming emitted by the antenna array located away from the location of the ear speaker for the wireless device is a suitable substitute for the first beam in response to determining that the antenna array located away from the location of the ear speaker for the wireless device is available for mmW RF beaming, wherein the second beam for mmW RF beaming emitted by the antenna array located away from the location of the ear speaker for the wireless device is emitted in a direction different from the first beam; and switching to the second beam for mmW RF beaming emitted by the antenna array located away from the location of the ear speaker for the wireless device for mmW operations in response to determining that the second beam for mmW RF beaming emitted by the antenna array located away from the location of the ear speaker for the wireless device is a suitable substituted for the first beam.

Example 13: The method of any of examples 1 to 12, further comprising: adjusting a mmW carrier quality report to deprioritize usage of mmW in response to determining: that the first beam in use for mmW RF beaming is not radiating in the direction associated with the user's head; that the antenna array located away from the location of the ear speaker for the wireless device is not available for mmW RF beaming; or that the second beam for mmW RF beaming emitted by the antenna array located away from the location of the ear speaker for the wireless device is not a suitable substituted for the first beam.

Example 14: The method of any of examples 1 to 13, further comprising, prior to adjusting the mmW carrier quality report to deprioritize usage of mmW: outputting an indication to the user to initiate a mmW reprioritization action in response to determining that the RF exposure condition for the wireless device is occurring during the voice call; determining the mmW reprioritization action occurs within a time threshold after outputting the indication to the user to initiate the mmW reprioritization action; and adjusting a mmW carrier quality report to deprioritize usage of mmW in response to determining that a mmW prioritization action does not occur within the time threshold.

Example 15: The method of any of examples 1 to 14, wherein the mmW reprioritization action is turning on a loud speaker of the wireless device or activating a handsfree type connection.

Example 16: The method of any of examples 1 to 15, further comprising: determining a user indication of accepting mmW de-prioritization is received in response to outputting the indication to the user to initiate the mmW prioritization action; and adjusting a mmW carrier quality report to deprioritize usage of mmW in response to determining that the user indication of accepting mmW de-prioritization is received.

Example 17: An apparatus for wireless communication comprising means for performing operations of the methods of any of examples 1-16.

Example 18: An apparatus for wireless communication comprising a memory; and at least one processor coupled to the memory, the memory and the at least one processor to perform operations of the methods of any of examples 1-16.

Example 19: A non-transitory processor readable storage medium having processor-executable instructions stored thereon configured to cause a processor of a wireless device to perform operations of the methods of any of examples 1-16.

The foregoing method descriptions and the process flow diagrams are provided merely as illustrative examples and are not intended to require or imply that the operations of various aspects must be performed in the order presented. As will be appreciated by one of skill in the art the order of operations in the foregoing aspects may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the aspects disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such aspect decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects without departing from the scope of the claims. Thus, the present disclosure is not intended to be limited to the aspects shown herein but is to be accorded the widest scope consistent with the following claims and the principles and novel features disclosed herein.

What is claimed is:

1. A method for reducing millimeter wave (mmW) radio frequency (RF) exposure, comprising:
   determining an RF exposure condition for a wireless device is occurring while the wireless device is operating in a mmW mode during a voice call;
   outputting an indication to initiate a mmW reprioritization action in response to determining that the RF exposure condition for the wireless device is occurring during the voice call;

determining the mmW reprioritization action occurs within a time threshold after outputting the indication to initiate the mmW reprioritization action; and adjusting a mmW carrier quality report to deprioritize usage of mmW in response to determining that the mmW reprioritization action does not occur within the time threshold.

2. The method of claim 1, wherein adjusting the mmW carrier quality report comprises setting a Channel Quality Indicator (CQI) for a mmW carrier to zero in a Channel State Information (CSI) report.

3. The method of claim 2, further comprising:
disabling mmW cell measurements and reporting in response to determining that the mmW reprioritization action does not occur within the time threshold.

4. The method of claim 2, wherein the RF exposure condition is a head adjacent usage condition.

5. The method of claim 4, wherein the RF exposure condition for the wireless device comprises one or more loud speakers of the wireless device being turned off and all handsfree type connections being inactive during the voice call.

6. The method of claim 2, further comprising:
determining the RF exposure condition for the wireless device ended during the voice call; and
adjusting a mmW carrier quality report to reprioritize usage of mmW in response to determining that the RF exposure condition for the wireless device ended during the voice call.

7. The method of claim 6, wherein adjusting the mmW carrier quality report to reprioritize usage of mmW comprises setting a Channel Quality Indicator (CQI) for the mmW carrier based on CQI measurements for the mmW carrier in a CSI report.

8. The method of claim 1, wherein the mmW reprioritization action is turning on a loud speaker of the wireless device or activating a handsfree type connection.

9. The method of claim 1, further comprising:
determining an indication of accepting mmW de-prioritization is received in response to outputting the indication to initiate the mmW reprioritization action; and
adjusting a mmW carrier quality report to deprioritize usage of mmW in response to determining that the indication of accepting mmW de-prioritization is received.

10. A method for reducing millimeter wave (mmW) radio frequency (RF) exposure, comprising:
determining an RF exposure condition for a wireless device is occurring while the wireless device is operating in a mmW mode during a voice call;
determining an antenna array located away from a location of an ear speaker for the wireless device is available for mmW RF beaming in response to determining that the RF exposure condition for the wireless device is occurring during the voice call;
in response to determining that the antenna array located away from the location of the ear speaker for the wireless device is available for mmW RF beaming:
preventing all antenna arrays other than the antenna array located away from the location of the ear speaker for the wireless device from emitting mmW beams; and
preventing the antenna array located away from the location of the ear speaker for the wireless device from emitting mmW beams having a beam width narrower than a threshold; and adjusting a mmW carrier quality report to deprioritize usage of mmW in response to determining that the antenna array located away from the location of the ear speaker for the wireless device is not available for mmW RF beaming.

11. The method of claim 10, wherein preventing the antenna array located away from the location of the ear speaker for the wireless device from emitting mmW beams having a beam width narrower than a threshold comprises modifying a codebook of the wireless device.

12. The method of claim 11, wherein modifying the codebook of the wireless device comprises removing L2 and narrower beams from the codebook.

13. The method of claim 10, wherein preventing all antenna arrays other than the antenna array located away from the location of the ear speaker for the wireless device from emitting mmW beams comprises modifying a codebook of the wireless device to remove beams from the codebook using all antenna arrays other than the antenna array located away from the location of the ear speaker for the wireless device.

14. A method for reducing millimeter wave (mmW) radio frequency (RF) exposure to a user of a wireless device, comprising:
determining an RF exposure condition for the wireless device is occurring while the wireless device is operating in a mmW mode during a voice call;
determining a first beam in use for mmW RF beaming is radiating in a direction associated with the user's head in response to determining that the RF exposure condition for the wireless device is occurring during the voice call;
determining an antenna array located away from a location of an ear speaker for the wireless device is available for mmW RF beaming in response to determining that the first beam in use for mmW RF beaming is radiating in the direction associated with the user's head;
determining a second beam for mmW RF beaming emitted by the antenna array located away from the location of the ear speaker for the wireless device is a suitable substitute for the first beam in response to determining that the antenna array located away from the location of the ear speaker for the wireless device is available for mmW RF beaming, wherein the second beam for mmW RF beaming emitted by the antenna array located away from the location of the ear speaker for the wireless device is emitted in a direction different from the first beam;
switching to the second beam for mmW RF beaming emitted by the antenna array located away from the location of the ear speaker for the wireless device for mmW operations in response to determining that the second beam for mmW RF beaming emitted by the antenna array located away from the location of the ear speaker for the wireless device is a suitable substitute for the first beam; and
adjusting a mmW carrier quality report to deprioritize usage of mmW in response to determining:
that the first beam in use for mmW RF beaming is not radiating in the direction associated with the user's head;
that the antenna array located away from the location of the ear speaker for the wireless device is not available for mmW RF beaming; or that the second beam for mmW RF beaming emitted by the antenna array located away from the location of the ear speaker for the wireless device is not a suitable substitute for the first beam.

15. An apparatus for wireless communication, comprising:
a memory; and
at least one processor coupled to the memory, the at least one processor configured to:
determine an RF exposure condition for a wireless device is occurring while the wireless device is operating in a mmW mode during a voice call;
output an indication to initiate a mmW reprioritization action based on the determination that the RF exposure condition for the wireless device is occurring during the voice call;
determine the mmW reprioritization action occurs within a time threshold after outputting the indication to initiate the mmW reprioritization action; and
adjust a mmW carrier quality report to deprioritize usage of mmW based on the determination that the mmW reprioritization action does not occur within the time threshold.

16. The apparatus of claim 15, wherein in configuring the at least one processor to adjust the mmW carrier quality report, the at least one processor is configured to set a Channel Quality Indicator (CQI) for a mmW carrier to zero in a Channel State Information (CSI) report.

17. The apparatus of claim 16, wherein the at least one processor is further configured to:
disable mmW cell measurements and reporting based on the determination the mmW reprioritization action does not occur within the time threshold.

18. The apparatus of claim 16, wherein in configuring the at least one processor to determine the RF exposure condition for the wireless device, the at least one processor is configured such that the RF exposure condition is a head adjacent usage condition.

19. The apparatus of claim 18, wherein in configuring the at least one processor to determine the RF exposure condition for the wireless device, the at least one processor is configured so that the RF exposure condition for the wireless device is one or more loud speakers of the wireless device being turned off and all handsfree type connections being inactive during the voice call.

20. The apparatus of claim 16, wherein the at least one processor is further configured to:
determine the RF exposure condition for the wireless device ended during the voice call; and
adjust a mmW carrier quality report to reprioritize usage of mmW based on the determination that the RF exposure condition for the wireless device ended during the voice call.

21. The apparatus of claim 20, wherein in configuring the at least one processor to adjust the mmW carrier quality report to reprioritize usage of mmW, the at least one processor is configured to set a Channel Quality Indicator (CQI) for the mmW carrier based on CQI measurements for the mmW carrier in a CSI report.

22. The apparatus of claim 15, further comprising at least one additional processor coupled to the memory, wherein the at least one additional processor or the at least one processor are configured to:
determine a user indication of accepting mmW de-prioritization is received in response to outputting the indication to the user to initiate the mmW prioritization action; and
adjust a mmW carrier quality report to deprioritize usage of mmW based on the determination that the user indication of accepting mmW de-prioritization is received.

23. An apparatus for wireless communication, comprising:
a memory; and
at least one processor coupled to the memory, the at least one processor is configured to:
determine an RF exposure condition for a wireless device is occurring while the wireless device is operating in a mmW mode during a voice call;
determine an antenna array located away from a location of an ear speaker for the wireless device is available for mmW RF beaming based on the determination that the RF exposure condition for the wireless device is occurring during the voice call;
based on the determination that the antenna array located away from the location of the ear speaker for the wireless device is available for mmW RF beaming:
prevent all antenna arrays other than the antenna array located away from the location of the ear speaker for the wireless device from emitting mmW beams; and
prevent the antenna array located away from the location of the ear speaker for the wireless device from emitting mmW beams having a beam width narrower than a threshold; and
adjust a mmW carrier quality report to deprioritize usage of mmW based on the determination that the antenna array located away from the location of the ear speaker for the wireless device is not available for mmW RF beaming.

24. The apparatus of claim 23, further comprising the antenna array located away from the location of the ear speaker for the wireless device, wherein:
in configuring the at least one processor to prevent the antenna array located away from the location of the ear speaker for the wireless device from emitting mmW beams having a beam width narrower than a threshold, the at least one processor is configured to modify a codebook of the wireless device; and
in configuring the at least one processor to prevent all antenna arrays other than the antenna array located away from the location of the ear speaker for the wireless device from emitting mmW beams, the at least one processor is configured to modify a codebook of the wireless device to remove beams from the codebook using all antenna arrays other than the antenna array located away from the location of the ear speaker for the wireless device.

25. An apparatus for wireless communication, comprising:
means for determining an RF exposure condition for a wireless device is occurring while the wireless device is operating in a mmW mode during a voice call;
means for outputting an indication to initiate a mmW reprioritization action based on the determination that the RF exposure condition for the wireless device is occurring during the voice call;
means for determining the mmW reprioritization action occurs within a time threshold after outputting the indication to initiate the mmW reprioritization action; and means for adjusting a mmW carrier quality report to deprioritize usage of mmW based on the determination that the mmW reprioritization action does not occur within the time threshold.

26. A non-transitory processor readable storage medium having processor-executable instructions stored thereon configured to cause a processor of a wireless device to perform operations comprising:
determining an RF exposure condition for the wireless device is occurring while the wireless device is operating in a mmW mode during a voice call;
outputting an indication to initiate a mmW reprioritization action based on the determination that the RF exposure condition for the wireless device is occurring during the voice call;
determining the mmW reprioritization action occurs within a time threshold after outputting the indication to initiate the mmW reprioritization action; and
adjusting a mmW carrier quality report to deprioritize usage of mmW based on the determination that the mmW reprioritization action does not occur within the time threshold.

27. An apparatus for wireless communication, comprising:
means for determining an RF exposure condition for a wireless device is occurring while the wireless device is operating in a mmW mode during a voice call;
means for determining an antenna array located away from a location of an ear speaker for the wireless device is available for mmW RF beaming based on the determination that the RF exposure condition for the wireless device is occurring during the voice call;
based on the determination that the antenna array located away from the location of the ear speaker for the wireless device is available for mmW RF beaming:
means for preventing all antenna arrays other than the antenna array located away from the location of the ear speaker for the wireless device from emitting mmW beams; and
means for preventing the antenna array located away from the location of the ear speaker for the wireless device from emitting mmW beams having a beam width narrower than a threshold; and
means for adjusting a mmW carrier quality report to deprioritize usage of mmW based on the determination that the antenna array located away from the location of the ear speaker for the wireless device is not available for mmW RF beaming.

28. A non-transitory processor readable storage medium having processor-executable instructions stored thereon configured to cause a processor of a wireless device to perform operations comprising:
determining an RF exposure condition for the wireless device is occurring while the wireless device is operating in a mmW mode during a voice call;
determining an antenna array located away from a location of an ear speaker for the wireless device is available for mmW RF beaming based on the determination that the RF exposure condition for the wireless device is occurring during the voice call;
based on the determination that the antenna array located away from the location of the ear speaker for the wireless device is available for mmW RF beaming:
preventing all antenna arrays other than the antenna array located away from the location of the ear speaker for the wireless device from emitting mmW beams; and
preventing the antenna array located away from the location of the ear speaker for the wireless device from emitting mmW beams having a beam width narrower than a threshold; and
adjusting a mmW carrier quality report to deprioritize usage of mmW based on the determination that the antenna array located away from the location of the ear speaker for the wireless device is not available for mmW RF beaming.

29. A method of wireless communication at a user equipment (UE), comprising:
determining a radio frequency (RF) exposure condition for a UE is occurring while the UE is operating in a mmW mode during a voice call; and
performing one or more actions to reduce mmW exposure, wherein the one or more actions to reduce mmW exposure comprise:
determining an antenna array located away from a location of an ear speaker for the UE is available for mmW RF beaming in response to the determination that the RF exposure condition for the UE is occurring during the voice call; and
in response to the determination that the antenna array located away from the location of the ear speaker for the UE is available for mmW RF beaming:
preventing all antenna arrays other than the antenna array located away from the location of the ear speaker for the UE from emitting mmW beams; and
preventing the antenna array located away from the location of the ear speaker for the UE from emitting mmW beams having a beam width narrower than a threshold.

30. The method of claim 29, wherein the RF exposure condition is a head adjacent usage condition.

31. The method of claim 29, wherein the RF exposure condition for the UE comprises one or more loud speakers of the UE being turned off and all handsfree type connections being inactive during the voice call.

32. An apparatus for wireless communication, comprising:
a memory;
at least one processor coupled to the memory, the at least one processor is configured to:
determine a radio frequency (RF) exposure condition for a UE is occurring while the UE is operating in a mmW mode during a voice call; and
perform one or more actions to reduce mmW exposure, wherein the one or more actions to reduce mmW exposure comprise:
to determine an antenna array located away from a location of an ear speaker for the UE is available for mmW RF beaming in response to the determination that the RF exposure condition for the UE is occurring during the voice call; and
in response to the determination that the antenna array located away from the location of the ear speaker for the UE is available for mmW RF beaming:
to prevent all antenna arrays other than the antenna array located away from the location of the ear speaker for the UE from emitting mmW beams; and
to prevent the antenna array located away from the location of the ear speaker for the UE from emitting mmW beams having a beam width narrower than a threshold.

33. The apparatus of claim 32, further comprising the antenna array located away from the location of the ear speaker for the UE,
  wherein in configuring the at least one processor to determine the RF exposure condition for the UE, the at least one processor is configured such that the RF exposure condition is a head adjacent usage condition.

34. The apparatus of claim 32, further comprising the antenna array located away from the location of the ear speaker for the UE,
  wherein in configuring the at least one processor to determine the RF exposure condition for the UE, the at least one processor is configured such that the RF exposure condition for the UE is one or more loud speakers of the UE being turned off and all handsfree type connections being inactive during the voice call.

35. A non-transitory processor readable storage medium having processor-executable instructions stored thereon configured to cause a processor of a user equipment (UE) to perform operations comprising:
  determining a radio frequency (RF) exposure condition for a UE is occurring while the UE is operating in a mmW mode during a voice call; and
  performing one or more actions to reduce mmW exposure, wherein the one or more actions to reduce mmW exposure comprise:
  determining an antenna array located away from a location of an ear speaker for the UE is available for mmW RF beaming in response to the determination that the RF exposure condition for the UE is occurring during the voice call; and
  in response to the determination that the antenna array located away from the location of the ear speaker for the UE is available for mmW RF beaming:
  preventing all antenna arrays other than the antenna array located away from the location of the ear speaker for the UE from emitting mmW beams; and
  preventing the antenna array located away from the location of the ear speaker for the UE from emitting mmW beams having a beam width narrower than a threshold.

36. The non-transitory processor readable storage medium of claim 35, wherein the RF exposure condition is a head adjacent usage condition.

37. The non-transitory processor readable storage medium of claim 35, wherein the RF exposure condition for the UE comprises one or more loud speakers of the UE being turned off and all handsfree type connections being inactive during the voice call.

38. A user equipment (UE), comprising:
  means for determining a radio frequency (RF) exposure condition for a UE is occurring while the UE is operating in a mmW mode during a voice call; and
  means for performing one or more actions to reduce mmW exposure, wherein the one or more actions to reduce mmW exposure comprise:
  means for determining an antenna array located away from a location of an ear speaker for the UE is available for mmW RF beaming in response to the determination that the RF exposure condition for the UE is occurring during the voice call; and
  in response to the determination that the antenna array located away from the location of the ear speaker for the UE is available for mmW RF beaming:
  means for preventing all antenna arrays other than the antenna array located away from the location of the ear speaker for the UE from emitting mmW beams; and
  means for preventing the antenna array located away from the location of the ear speaker for the UE from emitting mmW beams having a beam width narrower than a threshold.

39. The UE of claim 38, wherein the RF exposure condition is a head adjacent usage condition.

40. The UE of claim 38, wherein the RF exposure condition for the UE comprises one or more loud speakers of the UE being turned off and all handsfree type connections being inactive during the voice call.

* * * * *